(12) United States Patent
Faith et al.

(10) Patent No.: US 7,227,950 B2
(45) Date of Patent: Jun. 5, 2007

(54) DISTRIBUTED QUANTUM ENCRYPTED PATTERN GENERATION AND SCORING

(75) Inventors: Patrick L. Faith, Pleasanton, CA (US); Kevin P. Siegel, Milpitas, CA (US)

(73) Assignee: Visa International Service Association, Foster City, CA (US)

( * ) Notice: Subject to any disclaimer, the term of this patent is extended or adjusted under 35 U.S.C. 154(b) by 780 days.

(21) Appl. No.: 10/085,641

(22) Filed: Feb. 26, 2002

(65) Prior Publication Data

US 2002/0194503 A1    Dec. 19, 2002

Related U.S. Application Data

(60) Provisional application No. 60/272,213, filed on Feb. 27, 2001.

(51) Int. Cl.
*H04L 9/00*    (2006.01)

(52) U.S. Cl. .................. 380/44; 380/255; 380/277; 705/38; 705/64; 709/203

(58) Field of Classification Search .................. 380/44, 380/255, 277; 705/38, 64; 709/203; 713/171
See application file for complete search history.

(56) References Cited

U.S. PATENT DOCUMENTS

| | | | | |
|---|---|---|---|---|
| 4,812,628 A | | 3/1989 | Boston et al. | ............... 235/380 |
| 5,923,756 A | * | 7/1999 | Shambroom | ................ 713/156 |
| 5,978,787 A | | 11/1999 | Wong et al. | .................... 707/2 |
| 6,119,103 A | * | 9/2000 | Basch et al. | ................... 705/35 |
| 6,128,623 A | | 10/2000 | Mattis et al. | ................ 707/103 |
| 6,195,682 B1 | | 2/2001 | Ho et al. | ..................... 709/203 |
| 6,658,393 B1 | * | 12/2003 | Basch et al. | ................... 705/38 |

FOREIGN PATENT DOCUMENTS

| | | |
|---|---|---|
| EP | 0955217 A2 | 10/1999 |
| WO | WO 9854667 A1 * | 12/1998 |
| WO | WO 00/59203 | 10/2000 |

OTHER PUBLICATIONS

Dr. Alan M. Turing, "Turing's Treatise on Enigma", Chapter 6, downloaded from the Internet in Jun. 2002: http://frode.home.cern.ch/frode/crypto/Turing/, 18 pages.
International Search Report from corresponding PCT application PCT/US02/05977 mailed on Apr. 1, 2003.
Written Opinion in Corresponding PCT case PCT/US02/05977 mailed on Apr. 7, 2003.
EPC Examination Report; Oct. 5, 2005; Application No. 02 721 194.5-2221.

* cited by examiner

*Primary Examiner*—Gilberto Barron, Jr.
*Assistant Examiner*—Samson Lemma
(74) *Attorney, Agent, or Firm*—Beyer Weaver LLP

(57) ABSTRACT

Transaction scoring is performed in a distributed manner across a client-server computing system. A computing system for processing a transaction includes a server system and a client system. The server system is arranged to process information associated with the transaction, while the client system communicates with the server system and includes a key engine which is arranged to generate keys. The client system and the server system are arranged to cooperate to assess risk associated with the transaction. The client is arranged to send the keys generated by the key engine as a transaction to the server system.

12 Claims, 14 Drawing Sheets

Client-Server Environment

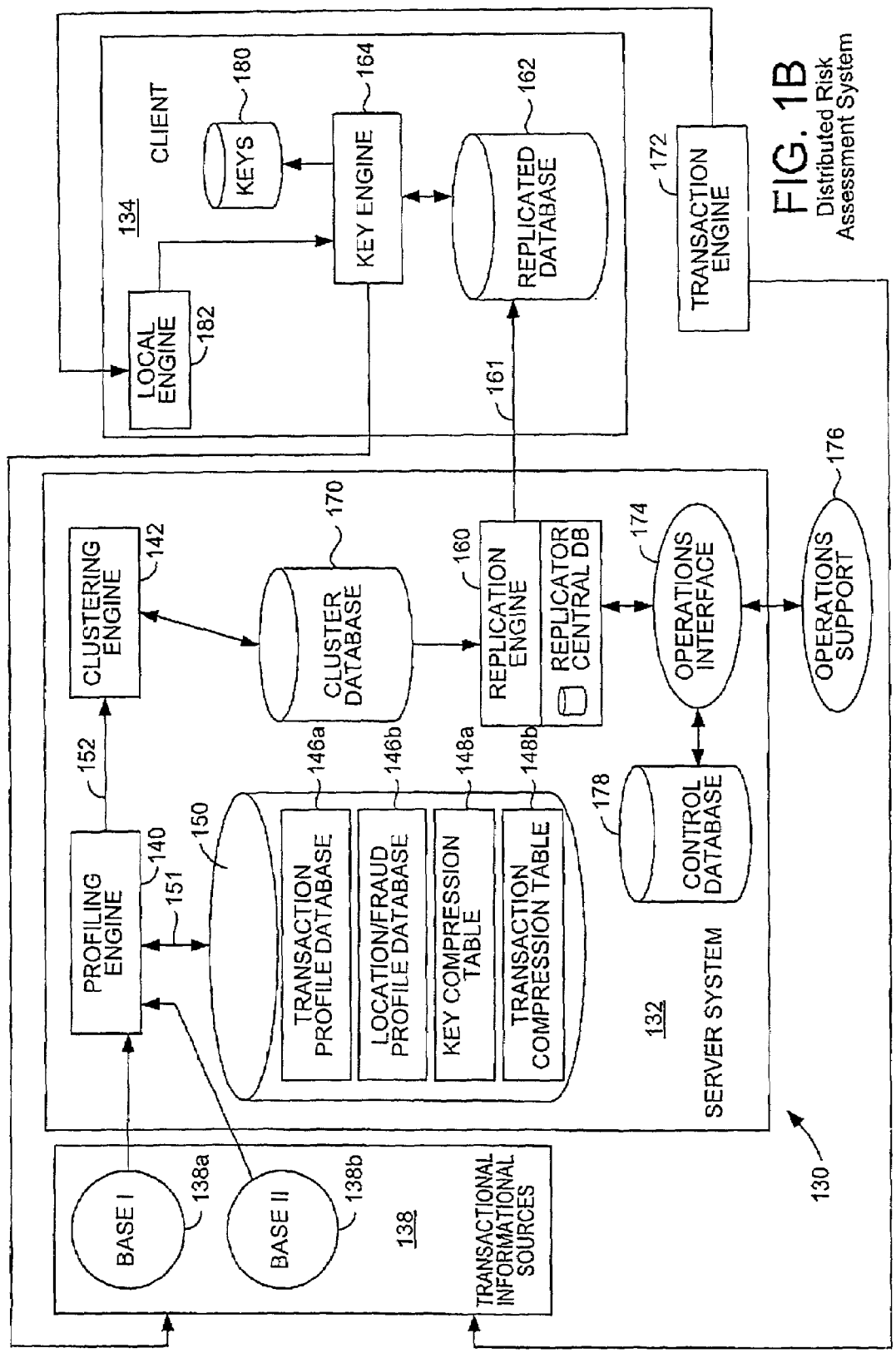

Transaction Profile

Location Compression Table Entry

Transaction Compression Table Entry

Crytmatics Framework

Key, Door and Lock Relationships

Profiling Engine
140

DISTRIBUTED QUANTUM ENCRYPTED PATTERN GENERATION AND SCORING

This application claims priority of U.S. provisional patent application No. 60/272,213, filed Feb. 27, 2001 of the same name, which is hereby incorporated by reference.

BACKGROUND OF THE INVENTION

1. Field of Invention

The present invention relates generally to computing systems for use in financial data analysis. More particularly, the present invention relates to methods and apparatus for efficiently enabling financial data analysis to occur in a distributed computing environment.

2. Description of the Related Art

As the use of bankcards is becoming more prevalent, issuers of bankcards are finding that their credit and fraud charge-offs, including bankruptcy losses, are increasing. When a bankcard account holder is forced to default on payments for transactions, e.g., financial transactions, performed using his or her bankcard, it is the issuers of the bankcards who are most often forced to absorb the associated losses. Hence, to protect themselves financially, issuers of bankcards are developing so-called "risk prediction" models which they use to assess risks, e.g., bankruptcy risk, fraud risk and non-bankruptcy risk, associated with a bankcard account holder. Risk prediction models for the detection of fraud are typically based upon the analysis of patterns exhibited in series of transactions performed by the bankcard holder in a single account.

Models for evaluating bankruptcy and credit risks are typically based on historical payment data and account performance data. Generally, risk prediction models for the evaluation of bankruptcy and credit risk use historical account performance data associated with a bankcard account or, more generally, the holder of a bankcard account, to identify a pattern of payment and to correlate the pattern of payment to known patterns of payment. In other words, the payment pattern of the account holder is compared against payment patterns which are considered as being indicative of a relatively high risk of future financial problems, as for example bankruptcy or credit loss.

With respect to fraud detection systems transaction data (data in the format of a string of data containing a series of different data fields), typically is not used directly by the fraud detection models. In general, the transaction data, which includes such data as an account number, a transaction amount, a transaction time, and a merchant zip code, as well as various other data, must be transformed into characteristic variables which may be used as direct inputs to the risk prediction models. These characteristic variables include, for example, a variable which holds the risk associated with a transaction occurring in a particular geographic area, a time-weighted sum of the total number of consummated financial purchases, and a running sum of the total amount of consummated purchases.

Typically, characteristic variables are generated from transaction data at a central server. In other words, transaction data is provided to a central server from a client, e.g., a payment gateway or a customer computer, and the central server processes, i.e., scores, the transaction data. To provide transaction data to a central server, the transaction data is typically sent from a client over a network connection. Such data transmission generally involves sending private information, e.g., credit account numbers, over the network connection. As the private information is being transmitted it may be accessed by virtually any individual who has access to the network connection. In addition, even if present at a central location, the private information might be viewed by a programmer or other data processor who is scoring the information. When the private information is accessed by an individual who wishes to use the information fraudulently, the integrity of the account number associated with the information may be compromised (among other information).

Further, additional information which may be useful in assessing risk, or generating a score, is often not transmitted from a client to a central server for processing. That is, some "at-source" data is often not provided to and, hence, unavailable to, a transaction server. As such, information that is potentially relevant to assessing risk may not be included in a risk assessment. For example, during an Internet transaction, information related to a web browser, the TCP/IP address, etc., is often not transmitted to a central server. Other types of "at source" data might not be transmitted to a central server.

Transaction data could be processed at distributed locations, but this presents problems relating to algorithms for scoring and how to keep the data secret at distributed locations. Therefore, what is needed is a method and an apparatus which is secure and enables substantially all at-source data to be used in a scoring process. In other words, what is desired is a secure, distributed system which enables transactions to be scored.

SUMMARY OF THE INVENTION

The present invention relates to performing transaction scoring in a distributed matter across a client-server computing system. Among other advantages, performing transaction scoring in a distributed manner across a networked client-server computing system enables transaction scoring to occur securely, while enabling information that is generally only available on the client to be used in the transaction scoring process. Novel scoring techniques are presented that allow scoring at distributed locations. In addition, scoring is performed upon encrypted transaction data to preserve privacy. The data need not be decrypted at any point.

According to one aspect of the present invention, a computing system for processing a transaction includes a server system and a client system. The server system is arranged to process information associated with the transaction, while the client system communicates with the server system and includes a key engine which is arranged to generate keys. The client system and the server system are arranged to cooperate to assess risk associated with the transaction. In one embodiment, the client is arranged to send the keys generated by the key engine as a transaction to the server system.

In another embodiment, the server system includes a profiling engine, a clustering engine, and a replication engine. The profiling engine is arranged to receive information associated with the transaction and to generate features associated with keys associated with the transaction. The clustering engine is in communication with the profiling engine, and is arranged to substantially cluster the features into secondary keys. The replication engine is arranged to compare the keys to the secondary keys to identify differences between the keys and the secondary keys. In such an embodiment, the replication engine may further be arranged to encrypt the differences between the keys and the secondary keys.

According to another aspect of the present invention, a computer-implemented method for processing a current transaction includes receiving information associated with the current transaction, and generating features for a first set of keys associated with the current transaction. The method also includes clustering the features into a first set of secondary keys, then comparing the first set of keys to a second set of keys which are associated with at least one previous transaction and comparing the first set of secondary keys and a second set of secondary keys that are associated with the previous transaction. A determination is made as to whether there are differences between the first set of keys and the second set of keys, and a determination is made as to whether there are differences between the first set of secondary keys and the second set of secondary keys. Any differences between the first set of keys and the second set of keys are encrypted. In addition, any differences between the first set of secondary keys and the second set of secondary keys are also encrypted.

In one embodiment, the method includes sending the encrypted differences between the first set of keys and the second set of keys to a key engine, and sending the encrypted differences between the first set of secondary keys and the second set of secondary keys to the key engine. In another embodiment, the method includes saving the information associated with the transaction to a second database. In such an embodiment, the information may be saved to the second database by a profiling engine.

According to still another aspect of the present invention, a computer-implemented method for handling a local transaction includes receiving a local transaction from a source, and encrypting at least a portion of the local transaction into one or more local transaction keys. At least one enhanced key is generated using the local transaction key or keys, and a determination is made regarding whether the enhanced key is a new key. The method also includes sending the enhanced key to the source when it is determined that the enhanced key is the new key, and processing the local transaction with the enhanced key using the source by applying a measure of transaction risk. In one embodiment, producing the enhanced key using the local transaction key includes applying the local transaction key to a local key database.

In accordance with yet another aspect of the present invention, a method for handling a current transaction within a client-server system that has a client computing system and a server computing system includes receiving information associated with the current transaction on the client computing system, and producing enhanced keys from the information associated with the current transaction using the client computing system. The enhanced keys are sent from the client computing system to the server computing system, and features for keys associated with the current transaction are generated using the server computing system. Secondary keys associated with the features are generated using the server computing system, and it is determined whether the keys associated with the current transaction and the secondary keys associated with the current transaction differ from the keys and the secondary keys associated with a past transaction using the server computing system. Finally, a key database is modified based upon the determination of whether the keys associated with the current transaction and the secondary keys associated with the features for keys associated with the current transaction differ from the keys and the secondary keys associated with the past transaction.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1B is a diagrammatic representation of a distributed risk assessment system in accordance with an embodiment of the present invention.

DETAILED DESCRIPTION OF THE EMBODIMENTS

A conventional system which uses data from multiple sources to perform pattern generation and, hence, scoring and processing of the data, generally performs scoring at a single, e.g., central, location. The performance of scoring at a single location generally does not enable all available detail to be included in the scoring or processing of a data to determine a likelihood of fraud. By way of example, not all of the information associated with the online purchases of a user is generally provided to a central scoring location. For instance, if a user is in the process of purchasing five thousand dollars worth of computer equipment, a central scoring location is substantially provided with information which states that the user is purchasing five thousand dollars worth of computer equipment. As such, no differentiation is made between the purchase of five computer systems which cost one thousand dollars each, and the purchase of one computer system which costs five thousand dollars. Hence, the fact that the likelihood of a purchase transaction being fraudulent is higher for the purchase of five computer systems than it is for the purchase of one computer system is not factored into an overall transaction scoring process.

Enabling distributed scoring to occur such that mathematics associated with transaction scoring may occur at different locations within a distributed network enables substantially all sets of data associated with a transaction to be factored into the scoring of the transaction. That is, "at source" data including, but not limited to, internet protocol routers, e-mail addresses, all information concerning the transaction, information concerning servers, etc., may be used in addition to information stored at a central scoring location to score a transaction.

In one embodiment, transaction information may be encrypted to provide security, while scoring occurs in a distributed manner. The information is encrypted and processed such that it is not necessary to decrypt the encrypted data, i.e., the mathematics associated with transaction scoring may be performed on encrypted data without decrypting the data, and without the need to preserve data. As such, encryption may be performed such that some data, such which may be substantially irrelevant to transaction scoring may be lost, since such encrypted data need not be preserved. It should be appreciated that encryption in which some data may be lost with substantially no adverse consequences may occur more efficiently than encryption in which all data must be preserved for decryption purposes.

System Components

Figure 1A:
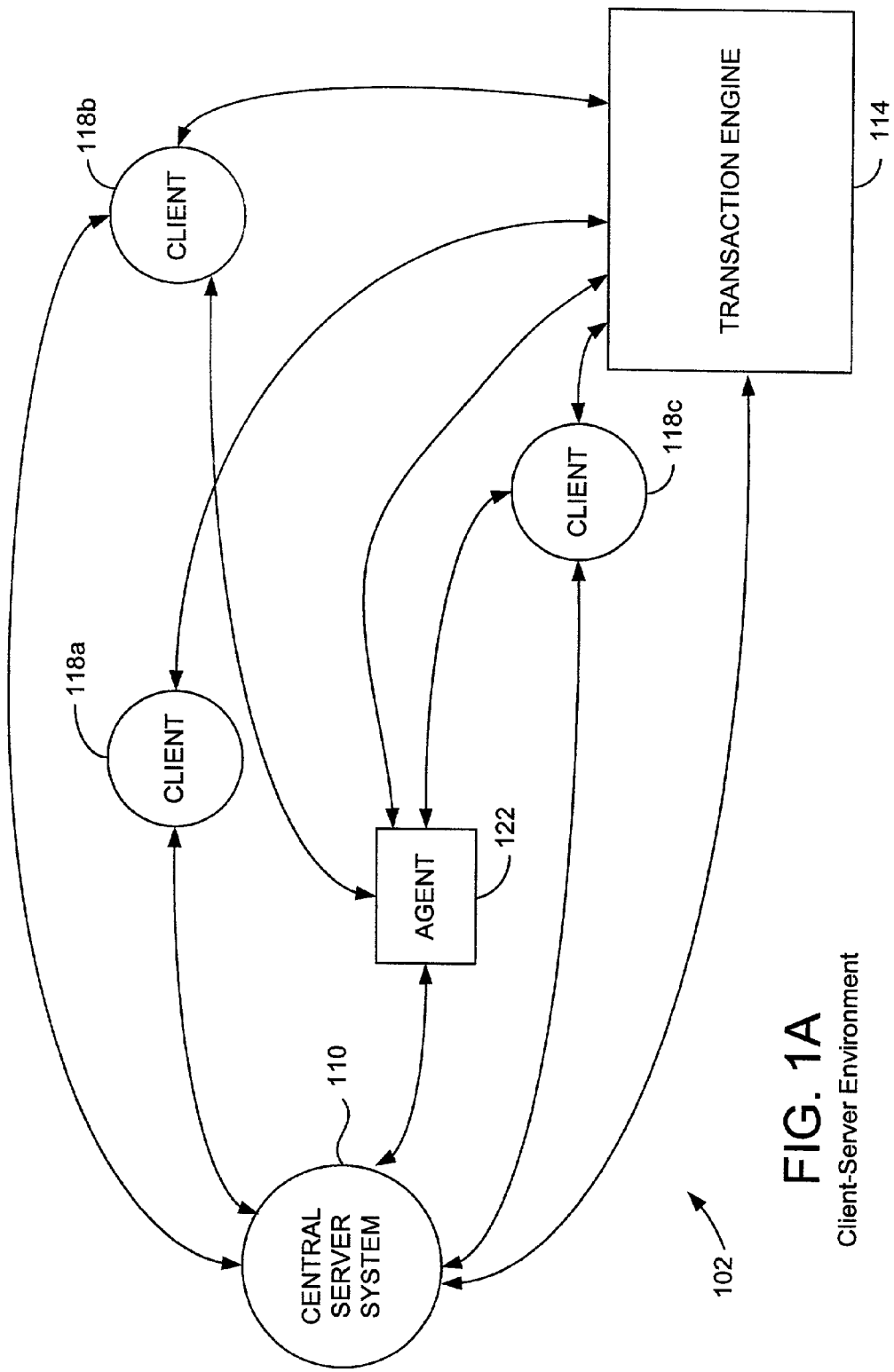
FIG. 1A is a diagrammatic representation of a client-server environment in accordance with an embodiment of the present invention.

FIG. 1A is a diagrammatic representation of a client-server environment in accordance with an embodiment of the present invention. A client-server environment 102, generally includes a central server 110, clients 118, and a transaction engine 114, and is arranged to enable data to be accumulated from throughout client-server environment 102 to perform pattern generation, e.g., scoring and processing. Clients 118 may include, but are not limited to, customer sites and point-of-sale terminals. Clients 118 may communicate substantially directly with central server 110 through a client/server interface. However, clients may also communicate with central server 110 through an agent 122. As shown, a client, e.g., client 118b, may communicate both directly with central server 110 and indirectly with central server 110 via agent 122.

In general, central server 110, clients 118, and agent 122 are computing systems which each include a processor and system memory. Typically, central server 110, clients 118, and agent 122 also include fixed storage such as a hard drive, removable storage such as a CD-ROM drive or a disk drive, and a network interface which effectively allows central server 110, clients 118, agent 122, and transaction engine 114 to communicate. It should be appreciated that suitable computing systems may generally include additional or fewer subsystems. For example, one suitable computing system may include more than one processor, i.e., a computing system may be a multi-processor system, or a cache memory.

Substantially any suitable type of communications link may be used to enable communication to occur between server 110, clients 118, and agent 122. The communications link may be, for example, a wired or cabled link. Alternatively, the communications link may be an unwired link, e.g., a radio frequency (RF) link. It should be appreciated that client-server environment 102 may generally include different types of links. By way of example, some links within client-server environment 102 may be cable links such as fiberoptic cable links or ISDN lines, while other links within client-server environment 102 may be unwired links.

Central server 110 is arranged to process transactions through communication with clients 118. In one embodiment, central server 110 may perform some processing of financial transactions, while clients 118 may perform other processing of financial transactions. That is, the processing of transactions may occur in a distributed manner such that central server 110 and at least one client 118 are involved in the processing. Central server 110 include engines such as a profiling engine, a clustering engine, and a replication engine, as will be described below with reference to FIG. 1B.

Typically, central server 110, agent 122, and clients 118 are linked to transaction engine 114. Transaction engine 114 is generally a network of computing systems, and may be associated with the Internet. Transaction engine 114 may also be associated with substantially any suitable system including, but not limited to, an issuing system, an acquiring system, or a telecommunications network. The telecommunications network provides secure communications between entities. The telecommunications communications network may be any suitable communications network that allows secure communication between computers. For example, communication via media such as telephone lines, cable, fiber optic, microwave, satellite, etc., may be used. Existing networks using secure links such as ATM networks, the Internet or propriety networks may be used. In one embodiment of the invention, the network is implemented using VisaNet, an existing global clearing and settlement system provided by Visa International Service Association of Foster City, Calif.

With reference to FIG. 1B, a distributed risk assessment system will be described in accordance with an embodiment of the present invention. A distributed risk assessment system (DRAS) 130 generally enables an encrypted scoring system to operate in a distributed manner. In general, DRAS 130 includes a server system 132 and a client 134, which may be considered to be a customer domain. Server system 132, which may be a central server such as central server 110 of FIG. 1A, is arranged to accept data in different formats from a detailed transactional information source 138. Data from transactional information sources 138 may include, but are not limited to, data in an FTL format, as well as clearing and settlement exception data. Examples of transactional information sources are banks, merchants, payment gateways and aggregators. In one embodiment, sources 138 include BASE I and BASE II, described below.

Transaction information sources 138 provide data, i.e., transaction data, to a profiling engine 140 that is associated with server system 132. Although profiling engine 140 may generally perform a variety of tasks, profiling engine 140 is arranged to communicate with a database 150 and a clustering engine 142. In one embodiment, profiling engine 140 is effectively a data collection, transaction profiling, and aggregation module. Profiling engine 140 processes data and outputs the data, e.g., in a substantially compressed format, to clustering engine 142, in the form of a transaction profile, which will be described below with respect to FIG. 2. As will be appreciated by those skilled in the art, a suitable transaction profile may be defined through an extensible markup language (XML).

Profiling engine 140 typically also provides outputs to database 150. The format of the output provided by profiling engine 140 to database 150 may vary widely depending upon the requirements of DRAS 130. In the described embodiment, output to database 150 is provided in a location compression identifier format and a transaction compression identifier format, as will be described below with reference to FIGS. 3 and 4, respectively.

Profiling engine 140 may include three "passes," or effective groups of operational processes. Each pass or group of operational processes may be executed prior to the execution of a subsequent pass or group of operational processes. A first pass may filter transactional information sources 138. A second pass may compress transaction data and generate risk curve data for clustering engine 142. A third pass may provide data used by the second pass to aggregate information, and may also forward aggregated data to clustering engine 142. Profiling Engine 140 is described further in FIG. 10.

Figure 2:
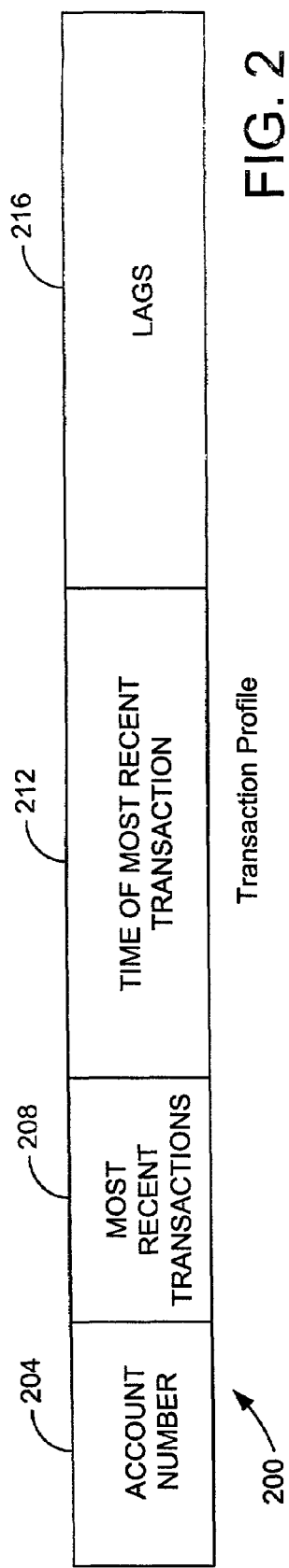
FIG. 2 is a diagrammatic representation of a transaction profile in accordance with an embodiment of the present invention.

Database 150 is effectively an amalgamation of smaller databases 146 and tables 148. Database 146 may include a transaction profile database 146a and a location/fraud profile database 146b, while tables 148 may include a key compression table 148a and a transaction compression table 148b. Transaction profile database 146a may include transaction profile records for any number of transactions. By way of example, transaction profile database may include a profile associated with the most recent transactions over a current time period, and a profile may appear as shown in FIG. 2. In one embodiment, transaction profile database 146a may include records for the approximately 180 most recent transactions which have occurred.

Location/fraud profile database 146b includes records for locations associated with the most recent transactions which were processed using profiling engine 140. Information included in each record includes number of transactions, total dollar amount, distribution of transactions by dollar amount, IP addresses for a given location, etc. Also included is a location compression identifier which is used in a location compression table, illustrated in FIG. 3. An entry in transaction compression table 148b may appear as shown in FIG. 4.

Profiling engine 140 communicates substantially bidirectionally with database 150 over link 151, and unidirectionally with clustering engine 142 over link 152. Clustering engine 142, which typically includes a key compression engine that is arranged to convert a transaction profile record into a key, is arranged to cluster and distribute information, and to read from and write to a cluster database 170. Cluster database 170 includes key databases, as will be described below with respect to FIG. 5. Information associated with cluster database 170 is used by a replication engine 160 which compares past information stored in cluster database 170 with current information, i.e., information associated with a current transaction passed from clustering engine 142 through cluster database 170. Replication engine 160 generally includes a replicator central database which facilitates the clustering of "deltas," or differences between current information and recent information. Generally, the replicator central database associated with replication engine 160 includes some information associated with cluster database 170.

Replication engine 160 communicates with an operations interface 174 and a replicated database 162 that is part of client 134. Operations interface 174 enables operations support 176 and control database 178 to be interfaced with replication engine 160. More generally, operations interface 174 enables operations support 176 to interface with server system 132. Operations support 176 is arranged to monitor server system 132 to assure that information, e.g., files, are provided to and from server system 132 in a timely manner and, further, to enable changes to be made to server system 132. Control database 178 is arranged to schedule jobs associated with server system 132, and to perform different aspects of process management. Operations interface 174 is preferably an XML-based interface containing public keys allowing for modification to the model.

Link 161 between replication engine 160 and a replicated database 162 is generally a secure transfer link which may be an internet link, and effectively serves as a client/server interface. Typically, link 161 passes encrypted information from replication engine 160, which generally encrypts information using standard encryption techniques, to replicated database 162. Replicated database 162 includes information, e.g., encrypted clusters of information, contained on both the replicator central database associated with replication engine 160 and cluster database 170.

Client 134 is generally associated with a payment gateway (not shown), e.g., a computer associated with a customer. A key engine 164, which is arranged to generate keys 180 communicates with replicated database 162. A local engine 182 generally sends a transaction to key engine 164 to cause keys 180 to be generated. In one embodiment, key engine 164 essentially serves as a scoring engine which causes scores to be generated. Alternatively, a scoring engine (not shown) may be maintained separately from key engine 164. Such a scoring engine may be arranged to perform a risk analysis for a given transaction. Local engine 182, in the described embodiment, is in communication with a transaction engine 172, which may be a part of transaction engine 114 of FIG. 1A. Transaction engine 172 may also be in communication with server system 132 through transactional information sources 138.

FIG. 2 is a diagrammatic representation of a transaction profile in accordance with an embodiment of the present invention. A transaction profile 200 includes an account number field 204 which identifies an account, e.g., a financial or credit account, and may be stored in a transaction profile database, as for example transaction profile database 146a of FIG. 1B. Transaction profile 200 also includes a field 208 which holds information relating to a number of recent transactions associated with an account identified in account number field 204. Although the number of recent transactions may vary, in the described embodiment, the number of recent transactions is generally limited to up to approximately 180 transactions.

A time of the most recent transaction recorded for an account identified in account number field 204 is stored in a field 212. The time may be stored in terms of a transaction year, a date, and a minute. Transaction profile 200 also includes fields 216 which contain lags. A lag, as will be understood by those skilled in the art, is effectively an array element in an array of values that corresponds to a particular transaction. Hence, fields 216 which contain lags essentially contain portions of arrays. In general, lags may include, but are not limited to, data elements pertaining to time deltas, dollar amounts, location compression identifiers, and transaction compression identifiers.

Figure 3:
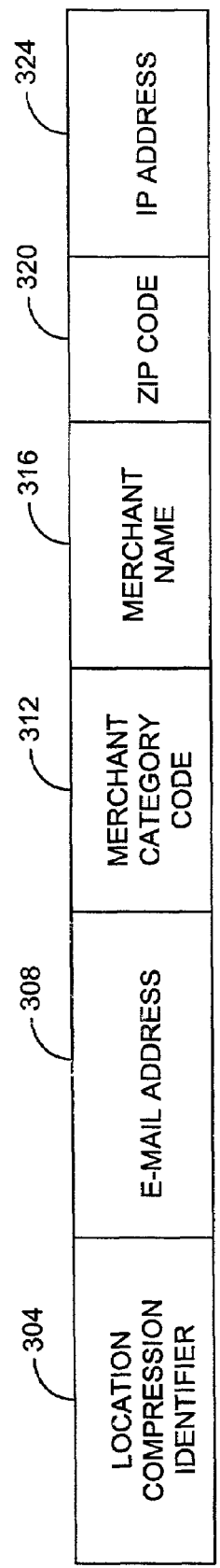
FIG. 3 is a diagrammatic representation of an entry in a location compression identifier table in accordance with an embodiment of the present invention.
Figure 4:
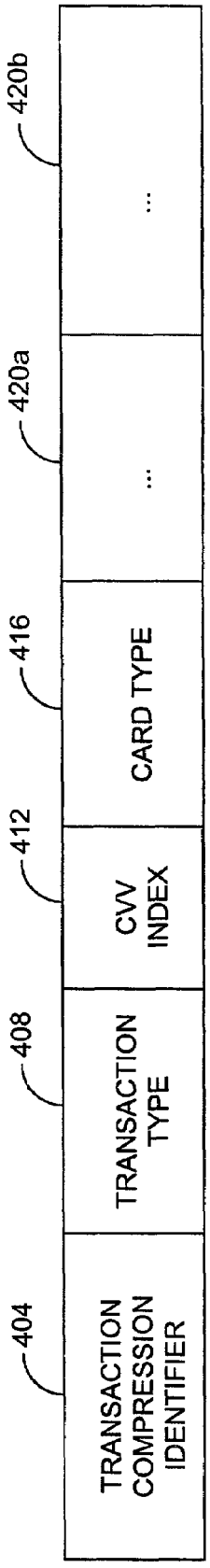
FIG. 4 is a diagrammatic representation of an entry in the transaction compression table of FIG. 1B.

Referring next to FIG. 3, one embodiment of an entry in a location compression identifier table will be described. An entry 300 in location compression identifier table may used to correlate a location compression identifier stored in a location/fraud profile database, e.g., location/fraud profile database 146b of FIG. 1B, with an actual location. Entry 300 includes a location compression identifier field 304 which is arranged to contain an identifier that effectively serves to identify entry 300. That is, location compression identifier field 304 holds a location compression identifier which is used in a location/fraud profile database. Entry 300 may also include a location identifier field 308 which holds a location identifier such as an electronic mail or e-mail address. The e-mail address contained in field 308 may be associated with a customer who caused a transaction to occur.

In general, the location identifier contained in location identifier field 308 is a unique identifier for either a physical or virtual location. Unique identifiers are comprised of but are not limited to merchant name, merchant category code and zip code. It should be appreciated that an e-mail address is only one example of a unique identifier. Other examples of unique identifiers may include, but are not limited to, a social security number or a tax payer identification number for an individual or an organization.

Also included as a part of entry 300 is a merchant category code field 312 which effectively identifies a type of goods or service which a merchant named in a field 316. A field 320 contains a zip code that is associated with the merchant named in field 316, while a field 324 contains an internet protocol (IP) address which identifies a virtual location associated with a transaction. In general, entry 300 may include substantially any field which identifies either a physical address or a virtual address.

As will be appreciated by those skilled in the art, not all fields within entry 300 may be filled in. In other words, only location compression identifier field 304 and one other field may be filled in for any given entry 300. Alternatively, more than one other field may be filled in as necessary. The information in entry 300 is intended to identify a "target," e.g., source, associated with a transaction. Accordingly, some sources, as for example physical sources, may essentially require more information in entry 300 than a virtual source.

FIG. 4 is a diagrammatic representation of an entry in a transaction compression identifier table, e.g., transaction compression table 148b of FIG. 1B, in accordance with an embodiment of the present invention. An entry 400 in a transaction compression table includes a transaction compression identifier field 404 which holds a transaction compression identifier. A field 408 is arranged to hold a transaction type, e.g., field 408 may contain an identifier which indicates that a transaction was a purchase. A field 412 is arranged to contain a CVV index which, in the described embodiment, is typically set to a true value. A card type may be stored in a field 416 which indicates which type of transaction card, e.g., a gold credit card or a platinum credit card. It should be appreciated that entry 400 may include other fields 420 which may contain, but are not limited to, information associated with a card type.

Figure 5:
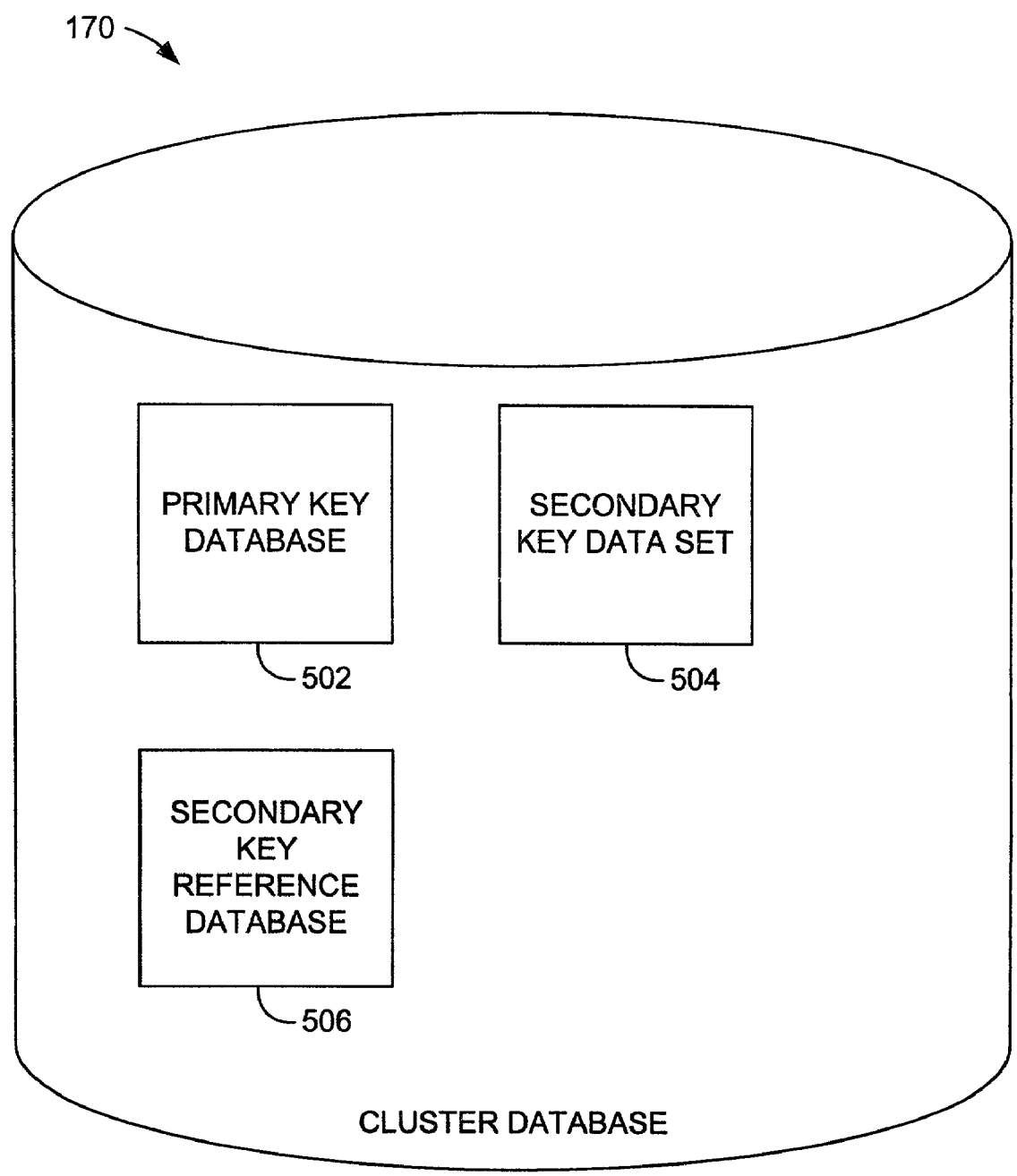
FIG. 5 is a diagrammatic representation of a cluster database in accordance with an embodiment of the present invention.

As mentioned above with respect to FIG. 1B, a cluster database may include key databases. With reference to FIG. 5, one embodiment of a cluster database will be described in accordance with the present invention. Cluster database 170 is generally read from by a clustering engine and a replication engine, while also being written to by the clustering engine. Cluster database 170 includes, but is not limited to, a primary key database 502 containing block keys, a secondary key data set 504 containing transfer keys, and a secondary key reference database 506 containing block and transfer keys. Block keys hold one value in a 32-byte data structure while transfer keys hold a fixed number of small data values, each of which is a pair of (value, probability) encoded into a single byte. Primary key database 502 also includes a list of primary keys.

Key Cryptmatics

"Keys," and "locks," are used by the distributed risk assessment system 130 to determine whether a transaction is or is likely to be fraudulent. In general, at least one of a server, i.e., a central processing system, and a client makes use of keys and locks in order to determine the likelihood that a transaction is fraudulent. A process for doing so is described in FIGS. 7-9.

Figure 6A:
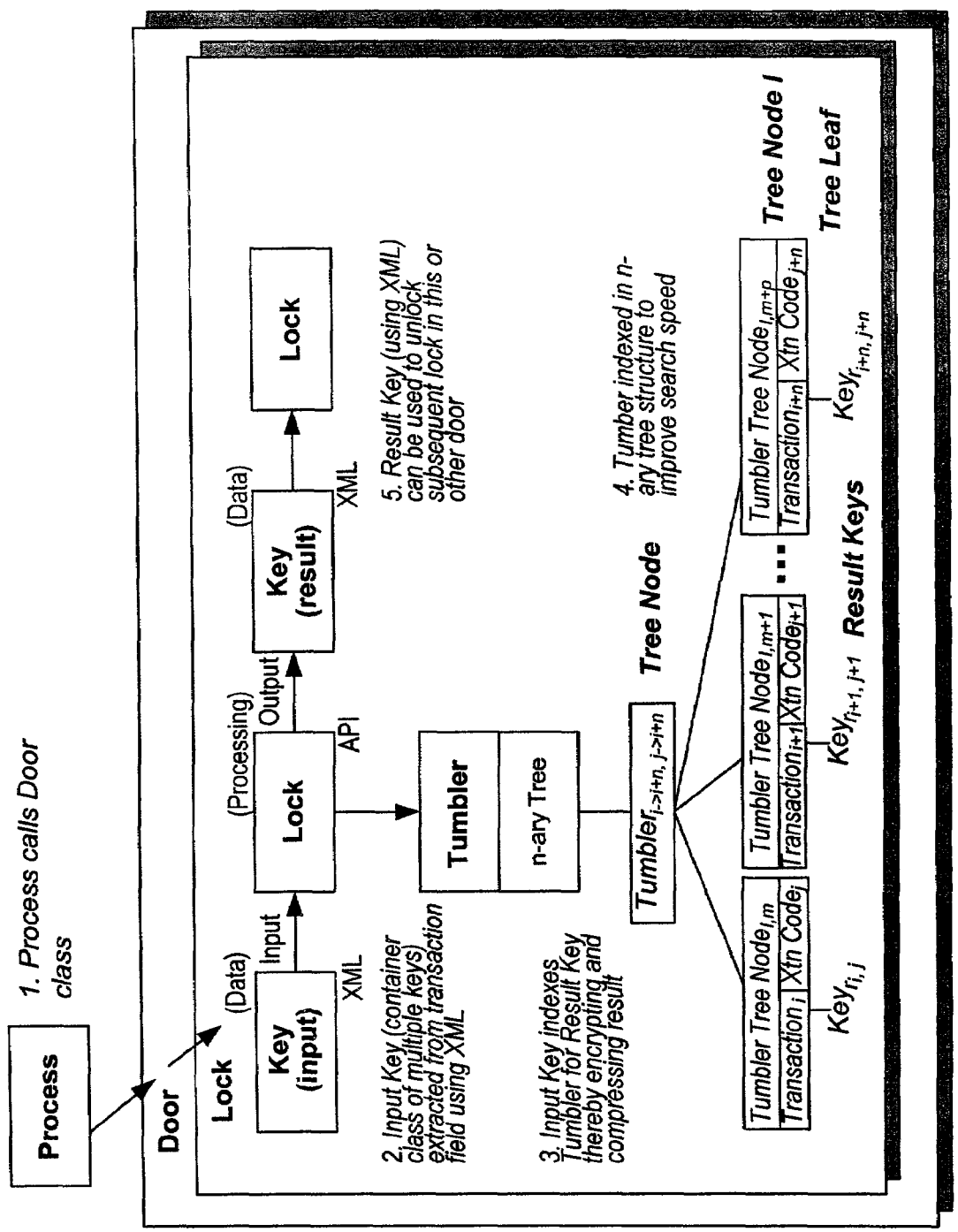
FIG. 6A illustrates the framework for the cryptmatics used for locks and keys.

FIG. 6A illustrates the key-lock cryptmatics framework. This figure illustrates the relationship between a process, a "door," a "lock," "keys" and "tumblers." A process is any suitable application software used to help process a transaction. Below is a brief description of elements of the system; more detailed explanation follows.

The "key" structure is the basic element of the system. A key is the structure used to group information from a transaction profile record. For instance, a key can represent an account number; an individual transaction within the account and for each transaction, a key can represent the location ID, amount, and status fields within the transaction. Attributes include: chain name; token; a unique identifier; a type such as account, transaction, location id, amount and status; and a timestamp.

The "chain" structure is another basic element of the system. A chain is a structure that contains keys. The chain can have zero keys, many keys, a limited number of keys, or an unlimited number of keys. Attributes include: key names; and maximum keys.

The "token" structure another basic element of the system. A token acts as a container for ptokens. All ptokens contained within the token preferably conform to the probability-type attribute. For example, if the probability-type is equal to "p", all ptokens within the token will have a percentage as the value of the probability attribute. If the if probability-type is equal to "h", all ptokens within the token will have a whole number as the value of the probability attribute. Attributes include: string, holding a ptoken value; probability type; and maximum number of ptokens.

The "ptoken" structure is another basic element of the system. A ptoken structure represents a probability distribution or a histogram. The probability attribute can be either a percentage or whole number. Attributes include: a value which identifies the number of occurrences in a probability distribution; and a probability representing a percentage.

The "door" element is used to control lock elements. It can have zero or more lock elements within it and may have one description. A door has an inhibitor threshold that compares against the key probability in order to constrain door processing if unnecessary. Attributes include: a lock; a unique identifier; an inhibitor identifier that points to a key identifier that contains a probability; and an inhibitor threshold. The inhibitor identifier identifies whether or not the door should act on a given key. The inhibitor threshold is a value that is used to control whether or not a door processes a given key. This value is compared to the probability contained within the key that the inhibitor identifier is pointing to. If this value is greater than the probability of that key, the door processes the key, if not, the door does nothing.

The "lock" structure is another basic element of the system. A lock is used to control the processing of a key. Each lock performs one specific function, for example a given lock might just perform encryption on a key and nothing else. A lock can perform hashing, or encryption on a key. A lock can create new keys or append data onto a key. Attributes include: a unique identifier; append, whether or not the lock appends data onto a result key or creates a new key; governor name; hash name; encryptor name; input identifier, a reference to a key acting as input to a tumbler; result identifier, a reference to the result key of the lock operation; tumbler identifier; distributed, whether or not there is a probability distribution within the tumbler population; and probability threshold. The probability threshold is used to restrict the lock operation in use of the tumbler. If the probability value of a tumbler element does not meet the threshold of the lock, the element will be ignored.

The "tumbler" provides the lock's data structure for matching input keys to identify result keys. The tumbler is an n-ary tree structure pre-configured with input key matches pre-encrypted and compressed. The n-ary tree structure is chosen for the benefit of improved search time performance. There is one tumbler tree for each lock. The tumbler tree contains chain and key with identifier, timestamp, and storage attributes.

The "hash" structure provides hashing capabilities to a lock and has a unique identifier. The "encryptor" structure provides encryption functionality to a lock. A lock uses an encryptor to encrypt data within a key. The "governor" structure is used to slow down the lock's processing time. Using a governor makes it harder for hackers to crack the encryption.

Figure 6B:
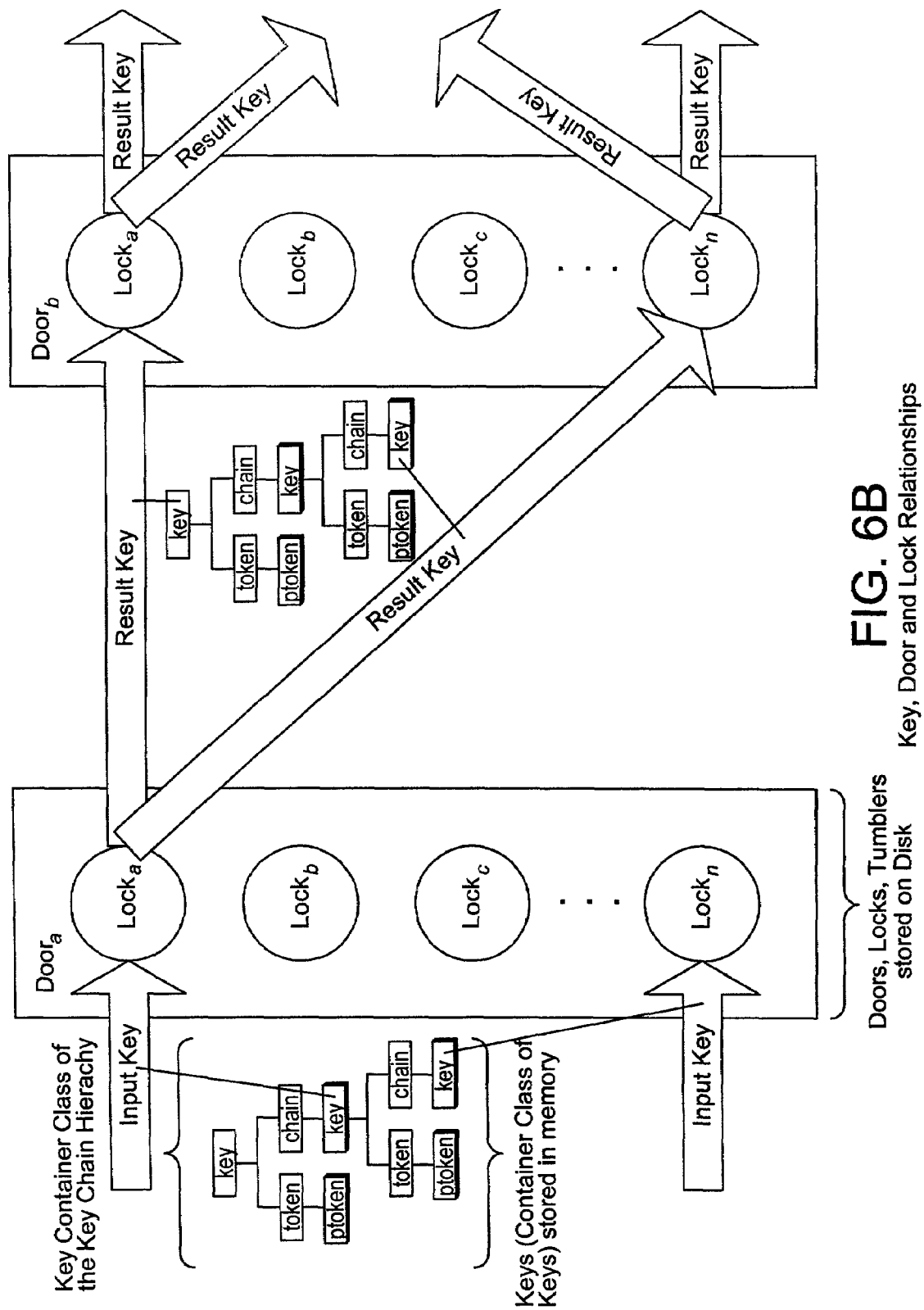
FIG. 6B illustrates the relationships between keys, locks, doors and a process.

FIG. 6B illustrates the relationships between keys, doors and locks. Contrasted with FIG. 6A, FIG. 6B shows multiple locks associated with a door, and the various possibilities.

The key-lock design designed is based on a paradigm consisting of keys, tumblers, locks, and doors. These terms have been briefly described above. Detailed definitions of these elements are now provided. The key-lock paradigm shown in FIG. 6B illustrates the following features: the result key can become an input key to one or more locks; a lock utilizes a tumbler to transform an input key to a result key; a door utilizes one or more locks; and a process utilizes one or more doors.

A result key is generated by the tumbler of a lock. The result key is used as either an end result of a process or as in input key in an interim stage of overall processing. A result key is used as an end result to provide a risk evaluation (for example) for a given transaction. A result key is also used as a next link in processing an additional tumbler generating yet another result key. The result key is unencrypted when first generated from the tumbler, but is preferably encrypted if it is to be used as a subsequent input key for further processing. A result key may also be a container class of multiple keys.

An input key is generated either from a previous tumbler calculation or as an extract from one or more fields of transaction. The input key is encrypted at client sites so that client users cannot discern the underlying process. As with a result key, an input key can be a container class of keys.

A key structure represents all fields within a transaction profile record. For instance, a key can correspond to an account number, transactions within the account and for each transaction, a key can relate to location id, amount, and status of the transaction. A "key" is frequently represented as a key structure or key container class containing the hierarchy of key structures described in FIG. 6D. The key's chain is a chain of keys that are related to a particular key. Each key has a token that is a container class for ptokens. Ptokens are either probability distributions or histograms for the key as defined in the token.

Regarding tokens and ptokens, each key has a token that describes the probability type of the (input or result) key and the number of ptokens for the key. The probability type can be either a probability distribution or a histogram. There is a ptoken for each discrete value range for probability curves and histograms. Each ptoken has an attribute for both a specific probability and the number of occurrences of that probability. Each token defines the number of ptokens (probabilities).

Locks are used to specify risk for a given transaction. The lock utilizes a tumbler to perform the actual translation of the input key to the result key. There is preferably one tumbler for each lock. Each lock has a corresponding hash (search algorithm) applied against the tumbler. The hash represents how the tumbler n-ary tree is traversed to acquire the result key based upon the input key. The hash-tumbler n-ary tree is used to maximize performance on what are potentially millions of tumbler node potential matches. This subsequently minimizes response time for identifying transaction-based risk.

Each lock also has an encryptor that encrypts the result keys used subsequently as input keys to other lock-tumbler pairs. The encryptor is preferably not applied to result keys used as an end-result of risk evaluation. Input keys (and tumbler lowest level tree nodes) are preferably encrypted in order to keep clients from discerning the underlying risk evaluation process.

The lock specifies if the input key is included as part of (appended to) the result key. If the "appended" attribute is not set then the result key contains only the contents of the leaf to the tumbler node matching the input key. If the "appended" attribute is set then the result key is the concatenation of the input key and the result key contents of the respective tumbler node leaf. The lock expires the input key in that it is no longer utilized in the system. This is useful in that the input key is no longer needed and eliminates the need to consciously remove the input key.

The lock also has a governor element that slows down processing of the lock. This has the effect that if there is an illicit intrusion into the lock structure, the system has sufficient time to detect and counteract the intrusion. The lock also has a probability threshold that rejects the input key if it does not meet the threshold. The input key's probability is stored in its ptokens element.

The lock indicates if the tumbler n-ary tree nodes are unique. If they are not unique, the lock ensures that the tumbler is fully traversed as opposed to stopping when the first input key match is found. There are situations where an input key may match multiple tumbler nodes thereby releasing multiple result keys.

The lock indicates via a "distributed" attribute if the tumbler n-ary tree consists of a range of probability distribution nodes that the input key must fit into as opposed to matching a node in the tumbler. The tumbler trees are composed of nodes that either match the input key or represent distribution curves that relate to the input key probability attribute (found in the input key's ptoken).

Figure 6C:
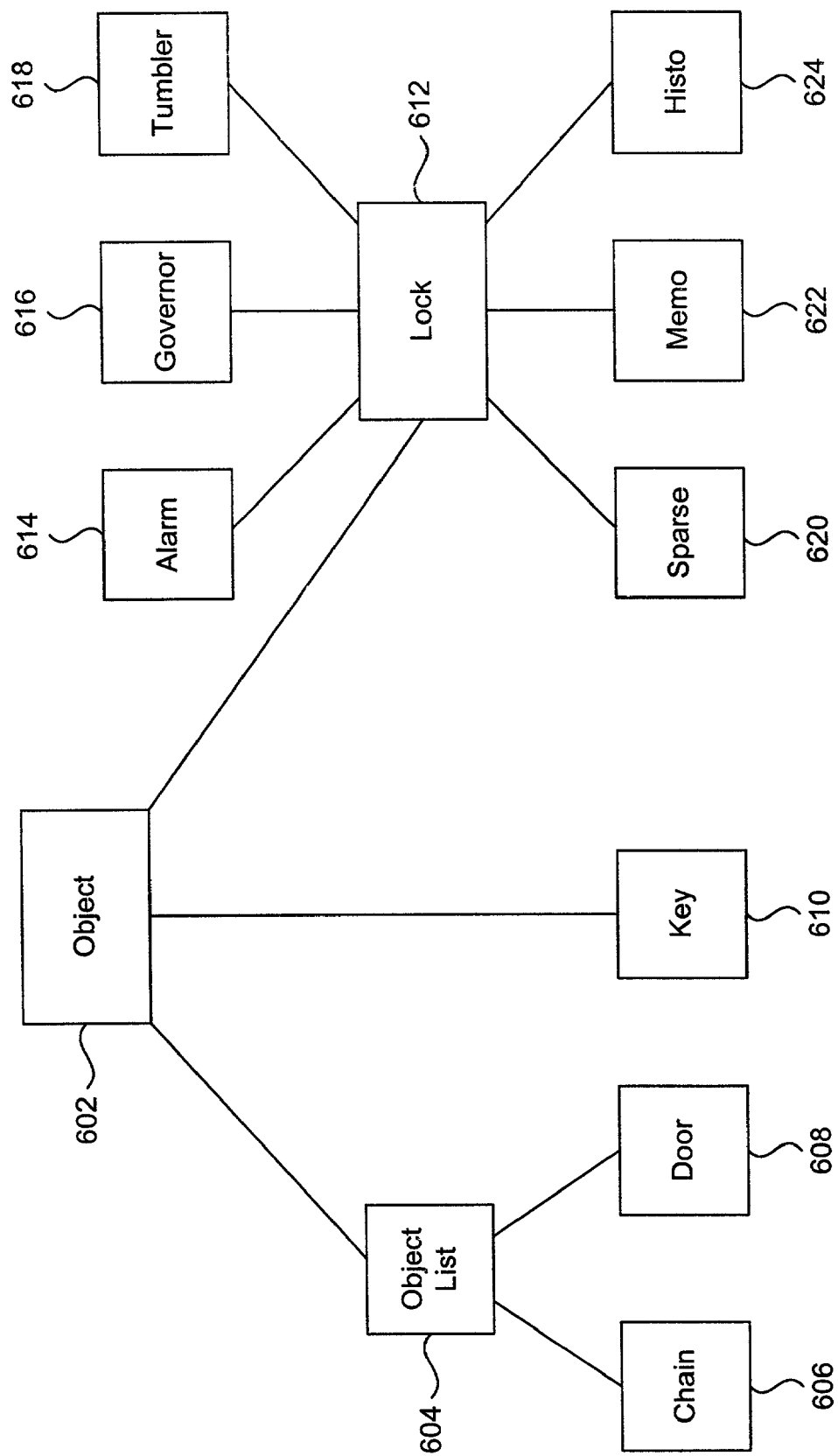
FIG. 6C is a diagrammatic representation of the relationships associated with an object in accordance with an embodiment of the present invention.

FIG. 6C is a diagrammatic representation of the relationships associated with an object in accordance with an embodiment of the present invention. An object 602 is associated with an object list 604, a key 610, and a lock 612. Object list 604 is a container class with a chain containing a list of keys and a door containing a list of locks, namely chain 606 and door 608. Chain 606 is a key chain, and door 608 is effectively a collection of locks. In one embodiment, chain 606 is a chain of keys that is associated with a particular key, e.g., an input key.

Door 608 generally includes locks which are likely to be implemented together, i.e., have at least a relatively a strong cohesion with one another. Specifically, door 608 is arranged to include locks which may be implemented together to determine a transaction risk. A door accomplishes a particular risk evaluation process through the use of multiple locks that depend on input keys to generate result keys. Door 608 also includes a threshold which is compared to each entrant input key probability, which may be stored in a ptoken of the key, to determine if the input key has permission to enter the door. In one embodiment, the input key is considered as having permission to enter the door if the entrant input key probability is either substantially equal to or above the threshold. Alternatively, if the entrant input key probability is less than the threshold, then the input key may not be given permission to enter the door. The use of a threshold, e.g., an inhibitor threshold, in addition to the use of ptokens enables a determination to be readily made as to whether a particular input key should be permitted to enter a door. This eliminates unnecessary processing that would reduce system performance.

Door 608 effectively provides a logical grouping of locks. In the described embodiment, door 608 may be located in storage, as for example on a disk, such that the seek and access times associated with locating the door on the disk may be minimized, thereby minimizing computational cost and response time, as will be appreciated by those skilled in the art. Hence, the performance of an overall system may be substantially optimized.

Key 610 is arranged to be processed in order to operate on a lock. In general, key 610 includes a list of tokens, and probabilities or histograms associated with the tokens. The probabilities or histograms are stored in ptokens that are associated with key 610. Each token defines the number of ptokens, or probabilities, while each ptoken has an attribute for both a specific probability and the number of occurrences of that probability. It should be understood that tokens, or tumbler numbers, are generally binary strings of bits. A key structure may represent substantially all fields within a transaction profile record, e.g., transaction profile 200 of FIG. 2. Hence, key 610 may correspond to at least one of an account number and a transaction. For each transaction, it should be appreciated that key 610 may relate to a location identifier, an amount, and a status of a transaction.

Typically, one or more locks 612 may be used to specify risk for a given transaction. Lock 612 generally utilizes tumbler 618 to translate an input key to a result key. It should be appreciated that there is generally only one tumbler that is associated with each lock. Lock 612 may have a corresponding search algorithm which is applied against the tumbler 618. The search algorithm, which may be considered to be a hash, provides a representation which enables a result key to be acquired based on an input key. In one embodiment, the use of such a hash generally minimizes response times for identifying transaction-based risk.

Lock 612 is associated with an alarm 614, a governer 616, a tumbler 618, a "sparse" 620, a "neuro" 622, and a "histo" 624. Alarm 614 is arranged to send an alert when a particular occurrence happens at a predefined frequency. Governer 616 is arranged to slow down a speed of computation, and may allow operations to occur substantially only at a particular computational speed. The use of governer 616 to slow down the processing of lock 612 allows an overall system, e.g., a fraud detection system, additional time to detect and, hence, to counteract any illicit intrusion with respect to lock 612. In one embodiment, governer 616 is further arranged to prevent break-ins with respect to lock 612 from occurring. Tumbler 618 is effectively a table, e.g., a look-up table, which serves as a decoder. That is, tumbler 618 may be used either to further encrypt encrypted data, or to expand out data using different probabilities.

Sparse 620 is for a sparse matrix lookup, neuro 622 takes the input key and applies a neural net against tumblers, and histo 624 is a histogram of the input against possible tumblers.

Generally, an input key is used to operate upon a lock that is a part of a door. The lock uses a tumbler to transform an input key into a result key. A result key may be used as either an end result of a process or as an input key at some stage, e.g., an intermediate stage, of overall processing. When a tumbler generates a result key, the result key is typically unencrypted. It should be appreciated that if the result key is to be used as an input key for subsequent processing, the result key may then be encrypted.

As previously mentioned, a tumbler is an n-ary tree data structure that generates a result key. The result key is a leaf of a node on the lowest node level of the tree. The node with the leaf result key is an encrypted copy of an input key or fits within a node-specified distribution of the input key probability. This node is used to match an encrypted input key to its mate on the tree. The match can occur either if the input key and node are identical or if the input key falls within a probability distribution specified by the node. This match of input keys in turn identifies the desirable result key. The correct matching node is found using a hash of the tree. The tumbler tree has all permutations of input key combinations at the lowest node level of the n-ary tree. This data structure can be tailor-designed for each lock to meet functional and performance needs. Tumblers are preferable in client configurations where clients are not allowed to discern the relationships between input keys and result keys.

Figure 6D:
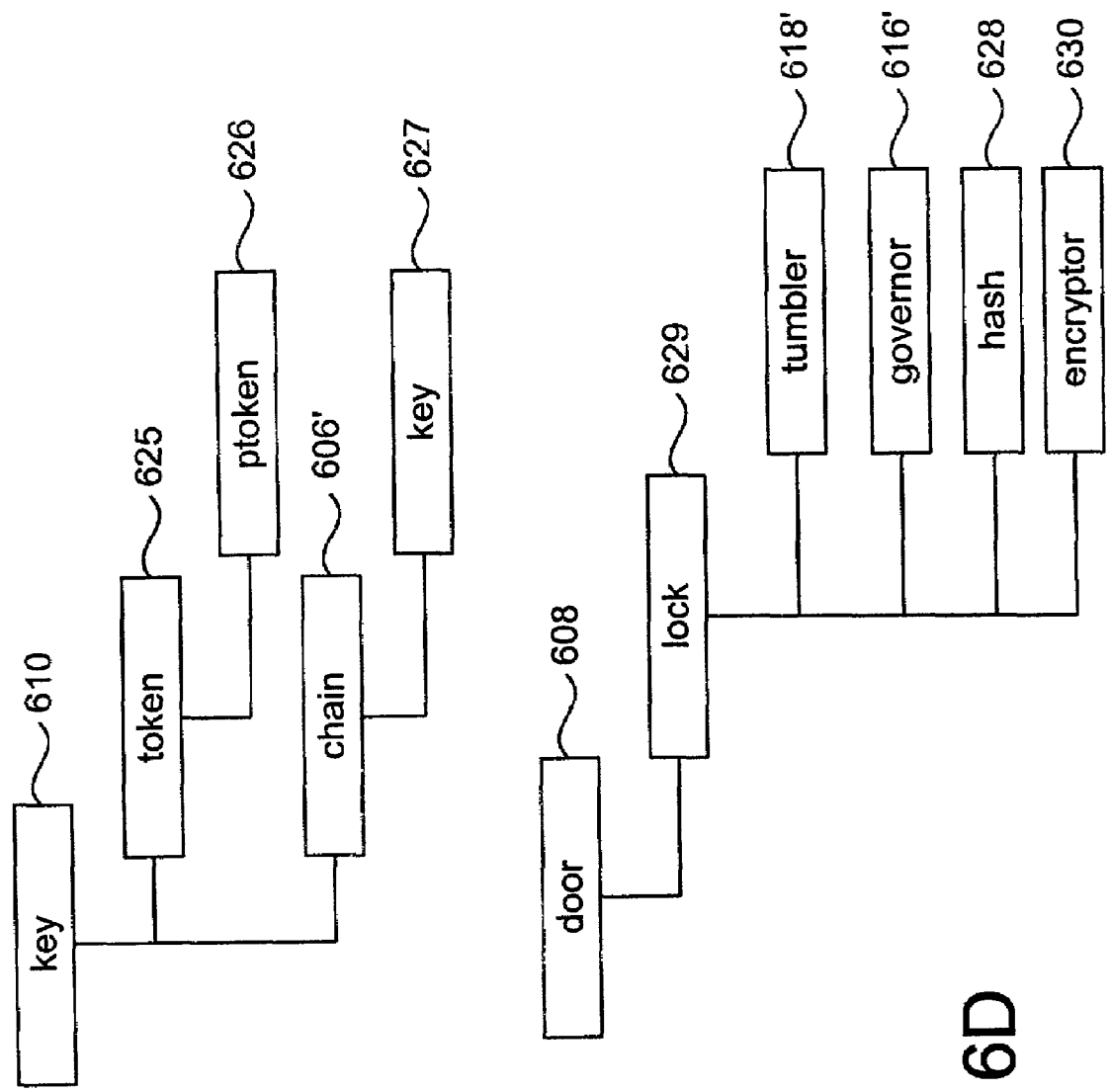
FIG. 6D is a diagrammatic representation of a key and a door in accordance with an embodiment of the present invention.

With reference to FIG. 6D shown is a high level visual representation of a possible hierarchy among elements. Key 610 may be considered to be a structure that is used to group information from a transaction profile record, e.g., transaction profile record 200 of FIG. 2. Key 610 may include a token 625, a chain 606', a ptoken 626, and a key 627. Token 625 serves as a container for ptokens 626. Chain 606' is generally a structure which contains keys. As previously mentioned, ptoken 626 represents a probability distribution or a histogram. Typically, a probability attribute for ptoken 626 may be either a percentage or a whole number.

Door 608 may be used to control locks 629. Although door 608 is shown as including one lock 629, it should be appreciated that the number of locks 629 associated with door 608 may generally be widely varied. For instance, a door 608 may have no associated locks. Lock 629 is typically used to control the processing of a key. It should be appreciated that each lock 629 within door 608 is generally arranged to perform a specific function. By way of example, a lock may perform hashing on a key, perform encryption on a key, create new keys, or append data to a key.

In the described embodiment, a lock 629 contains a tumbler 618', a governor 616', a hash element 628, and an encryptor 630. Lock 629 uses an input key to search tumbler 618', which typically returns a result key. Governor 616', hash element 628, and encryptor 630 may be used by lock 629 to perform additional processing.

As previously mentioned, a tumbler such as tumbler 618' of FIG. 6C provides a structure for essentially matching input keys to result keys. A tumbler may be preconfigured with input key matches, pre-encrypted, and compressed. Although the tumbler may be of substantially any suitable structure, the use of an n-ary tree structure provides from an improved search time performance over the search time performance associated with other structures.

Figure 6E:
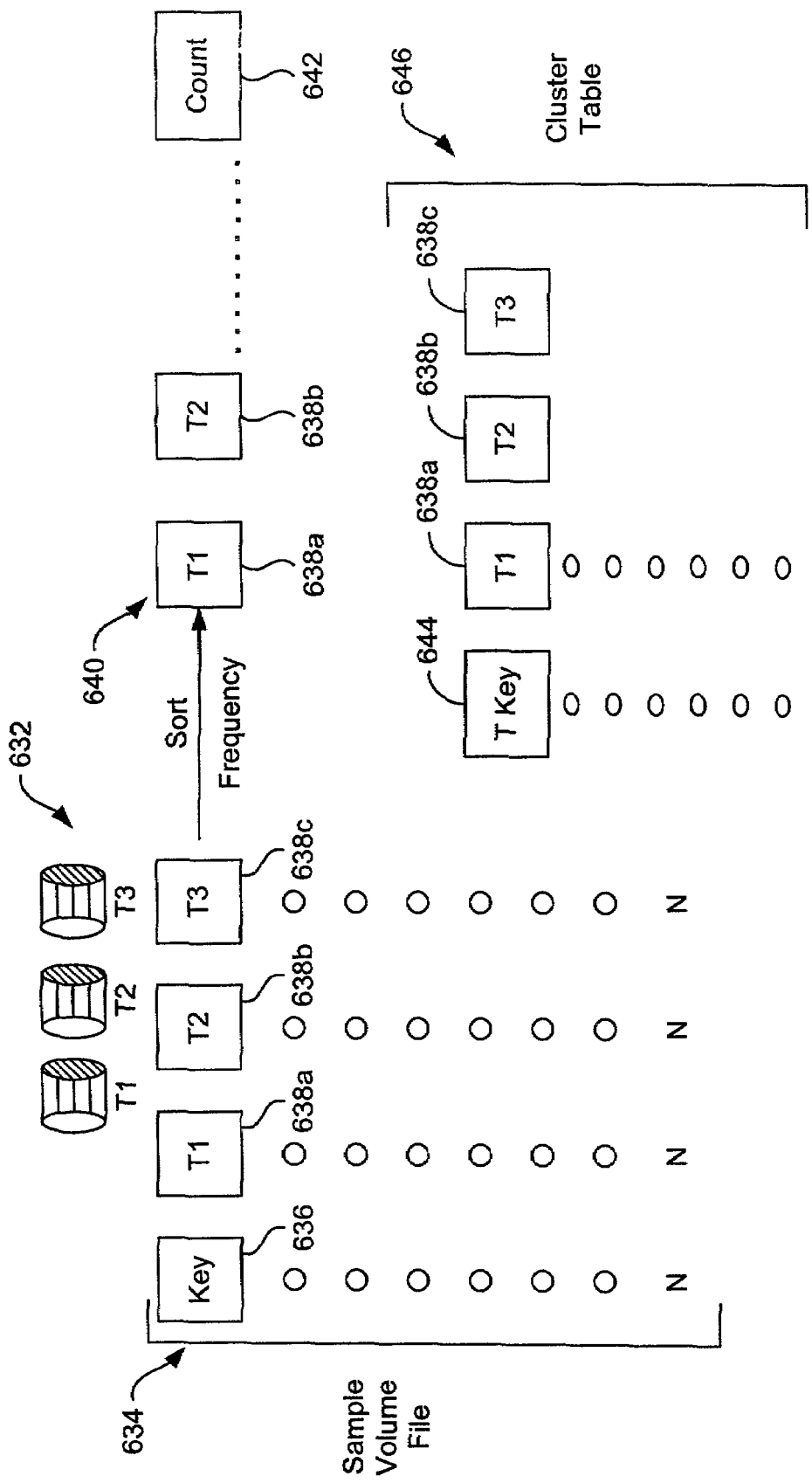
FIG. 6E is a diagrammatic representation of a tumbler cluster in accordance with an embodiment of the present invention.

FIG. 6E is a diagrammatic representation of a the generation of a tumbler cluster in accordance with an embodiment of the present invention. Such generation is preferably performed by the clustering engine. A tumbler cluster may be used to facilitate the look up of a result key for any given input key. For coding practice a tumbler can have a tumbler within a tumbler and it is possible to allow for multi-dimensional sparse matrix lookups.

A tumbler cluster 632 is associated with a sample volume file 634 which includes a key 636 and a tumbler combination 638. Tumbler combination 638 is generally associated with key 636. As will be appreciated by those skilled in the art, sample volume file 634 typically includes multiple keys and tumbler combinations.

A clustering engine such as clustering engine 142 of FIG. 1B is arranged to effectively "strip" key 636 from sample volume file 634, sort tumbler combination 638, and perform a frequency analysis with respect to tumbler combination 638. The frequency analysis with respect to tumbler combination 638 may produce a series 640 of tumbler combination components, e.g., components 638a and 638b, and a count 642. The count is the number of occurrences of a specific combination.

The clustering engine then creates a new key 644, i.e., a "T key" or a result key, which is associated with tumbler combination 638, and a component of a cluster table 646.

Figure 6F:
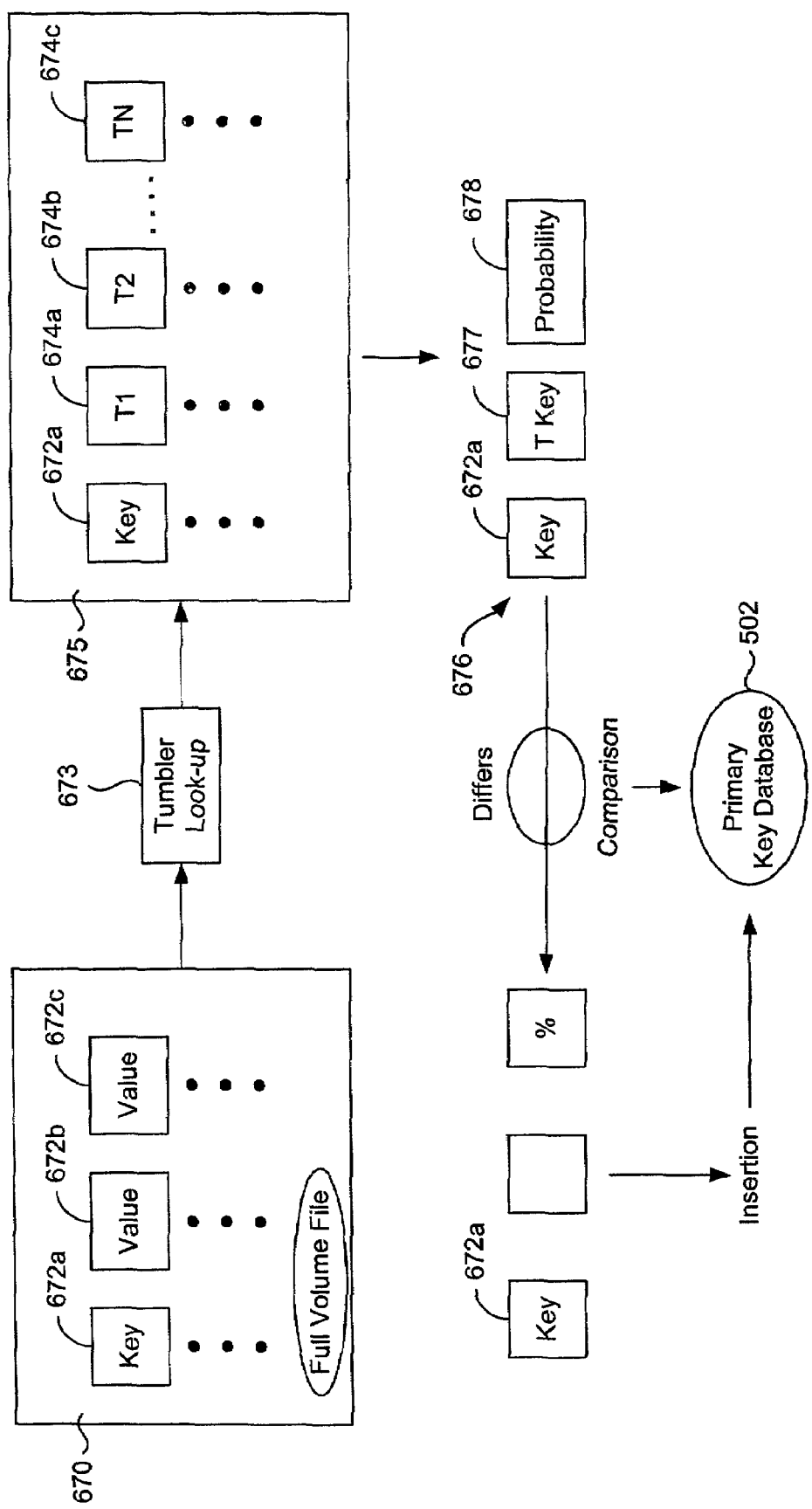
FIG. 6F is a diagrammatic representation of a tumbler look up process in accordance with an embodiment of the present invention.

FIG. 6F is a diagrammatic representation of a tumbler look up process used by the clustering engine. A full volume input file 670 includes features which are outputted from profiling engine 140. The features include keys 672a, such as input keys, and values 672b, 672c. Keys 672a are typically approximately two bytes in size, and include information such as an account number and a location. Values 672b, 672c may either be integers or floating point values, and may represent daily amounts of transactions, zip codes, and substantially any information which may be suitable for assessing risk.

Full volume file 670 is typically converted and placed into cluster database 170 using a tumbler look-up 673. Within the cluster database, a key 672a may be stored in a file 675 which includes tumbler numbers 674, or tokens. Specifically, tumbler look-up 673 converts values 672b, 672c to tumbler numbers 674.

Within the cluster database, in addition to file 675, a key chain 676 may also be present. Key chain 676 includes key 672a, as well as a temporary key, e.g., "T key" 677, and a probability 678. Probability 678 typically represents the probability that key 672 is effectively the same as "T key" 677. It should be appreciated that there may be a series of key chains 676 within the cluster database. If there are substantial differences between key 672a and "T key" 677, then key 672a may be inserted in a primary key database 680 associated with a cluster database.

Processing Flow

Keys, locks, and tumblers are used by the distributed risk assessment system 130 to determine whether a transaction is or is likely to be fraudulent. In general, at least one of a server, i.e., a central processing system, and a client makes use of keys, locks, and tumblers in order to determine the likelihood that a transaction is fraudulent.

Figure 7:
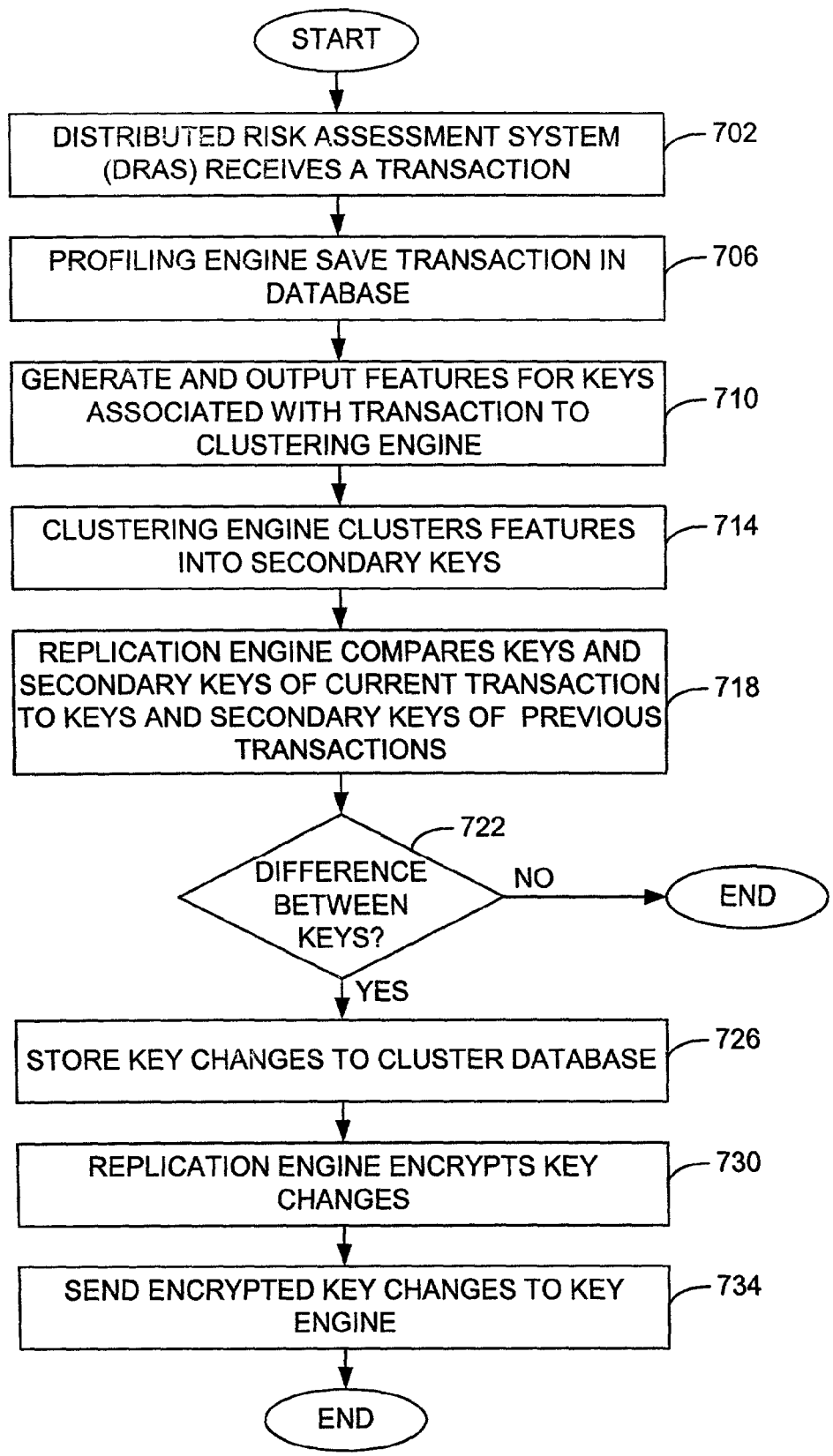
FIG. 7 is a flow diagram which illustrates the steps associated with quantizing probabilistic logic using a server in accordance with an embodiment of the present invention.

Referring next to FIG. 7, the steps performed by a server system 132 will be described in accordance with an embodiment of the present invention. That is, the steps associated with quantizing probabilistic logic with respect to the authenticity of a transaction by a server of a client-server system will be described. A method of quantizing probabilistic logic begins at step 702 in which a distributed risk assessment system receives a transaction. The transaction is typically received from within sources 138, and may include, but is not limited to, an alert, settlement advice, payment information, and performance data. In other words, the transaction may relate to substantially any type of financial transaction.

After the transaction is received, the profiling engine saves the transaction into a database in step 706. In one embodiment, the profiling engine saves the transaction into a database that contains a transaction profile database, a location/fraud profile database, a key compression table, and a transaction compression table, e.g., database 150 of FIG. 1B. Once the transaction is saved into a database, features for keys associated with the transaction are generated and output to a clustering engine in step 710 as input keys. In other words, compression keys are effectively created in-line by a profiling engine through communication with a database, e.g., database 150 of FIG. 1B, and a series of values associated with the keys are output to the clustering engine. The values may include, but are not limited to, probabilities associated with the keys.

The clustering engine, upon receiving features for keys associated with the transaction, clusters the features in step 714 into secondary keys, or T-keys. A replication engine, e.g., replication engine 160 of FIG. 1B, compares the keys and the secondary keys of the transaction, i.e., the current transaction, to the keys and the secondary keys of previous transactions. The comparison is generally made to determine if any updating is needed, and may be performed through the use of tumblers, as described above.

A determination is made in step 722 as to whether there are any differences between the keys. If it is determined that there are substantially no differences between the keys, then the processing by a central system in response to a transaction is completed. Alternatively, if it is determined that there are differences between the keys, then the indication is that updating is needed. Accordingly, process flow moves from step 722 to step 726 in which key changes are stored in a cluster database, e.g., cluster database 170 of FIG. 1B. It should be appreciated that the key changes which are stored in the cluster database are typically unencrypted.

After the key changes a stored in the cluster database, the replication engine encrypts the key changes in step 730. Once encrypted, the key changes are sent in step 734 to a key engine such as key engine 164 of FIG. 1B, and the processing performed by a central processor is completed. It should be appreciated that, in general, a key engine is associated with an at-source processor, or a customer domain.

Figure 8:
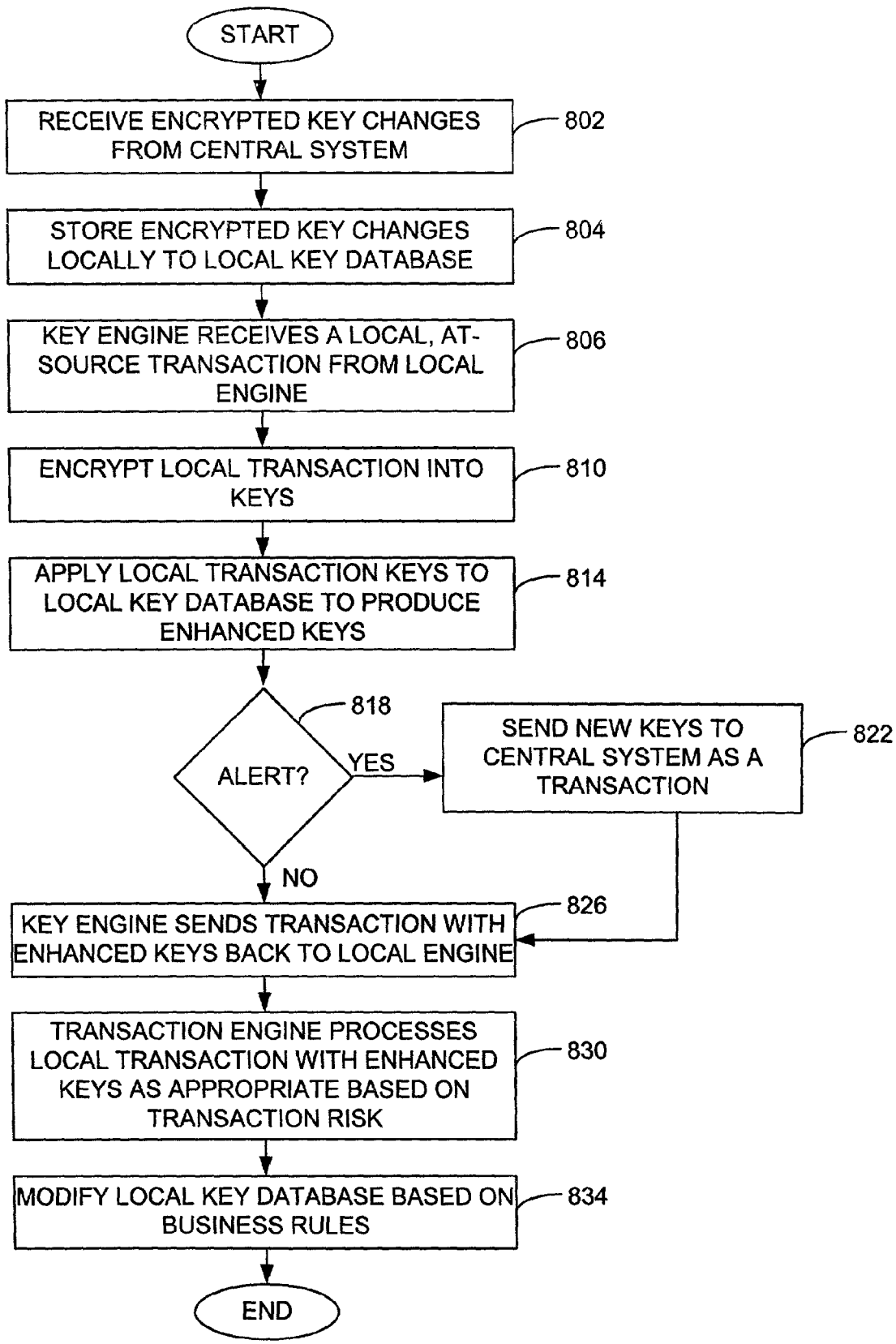
FIG. 8 is a flow diagram which illustrates the steps associated with local, or at-source, processing in accordance with an embodiment of the present invention.

FIG. 8 is a process flow diagram which illustrates the steps associated with local, or at-source, processing in accordance with an embodiment of the present invention. The local processing, e.g., processing by a client or customer domain 134, begins at step 802 in which encrypted key changes are received from a server system 132. Although the encrypted key changes may be received over substantially any suitable transmission linkage, in the described embodiment, encrypted key changes are received over a communications link between a replication engine and a replicated database, e.g., communications link 161 between replication engine 160 and replicated database 162 of FIG. 1B. Once the encrypted key changes are received, the encrypted key changes are stored locally in step 804 to a local key database. In one embodiment, the local key database is a part of the replicated database.

In step 806, a key engine receives a local, at-source transaction from a local engine or server. Then, in step 810, the local transaction is encrypted into keys by the key engine. Typically, the local transaction is a clear token, i.e., the local transaction is unencrypted. Hence, encrypting the local transaction into keys generally involves encrypting the clear token.

After the local transaction is encrypted, local transaction keys are applied to the local key database in step 814 to produce enhanced keys. The steps associated with applying local transaction keys to the local key database will be described below with respect to FIG. 9. Once enhanced keys are produced, a determination is made in step 818 regarding whether an alert has resulted from applying local transaction keys to the local key database. If an alert is generated, the implication is that new keys have been generated. Typically, such new keys are added into a database associated with a central processing system. Accordingly, process flow moves from step 818 to step 822 in which the new keys are sent to the central processing system as a transaction. When the new keys are sent to the central processing system, the new keys are inserted into a database associated with a profiling engine. Alternatively, if the determination in step 818 is that no alert was generated, the indication is that no new keys have been generated, e.g., when the local transaction was encrypted into keys in step 810. As such, process flow proceeds from step 818 to step 826 where the key engine sends a transaction with the enhanced keys back to the local engine. In one embodiment, probabilities are sent back to the local engine in addition to the enhanced keys.

Once the enhanced keys are sent back to the local engine, a transaction engine processes the local transaction, i.e., the local transaction received in step 806. The transaction engine processes the local transaction with enhanced keys as appropriate based upon the transaction risk in step 830. That is, the transaction engine processes the local transaction based upon factors including the probabilities associated with the local transaction.

After the transaction engine, e.g., transaction engine 172 of FIG. 1B, processes the local transaction, the local key database is modified based upon business rules associated with the overall system in step 834. Modifying the local key database generally includes storing a key type on the local system. In one embodiment, a transaction key type may be temporarily stored, e.g., persistently stored temporarily. Once the local key database is modified, local processing is completed.

Figure 9:
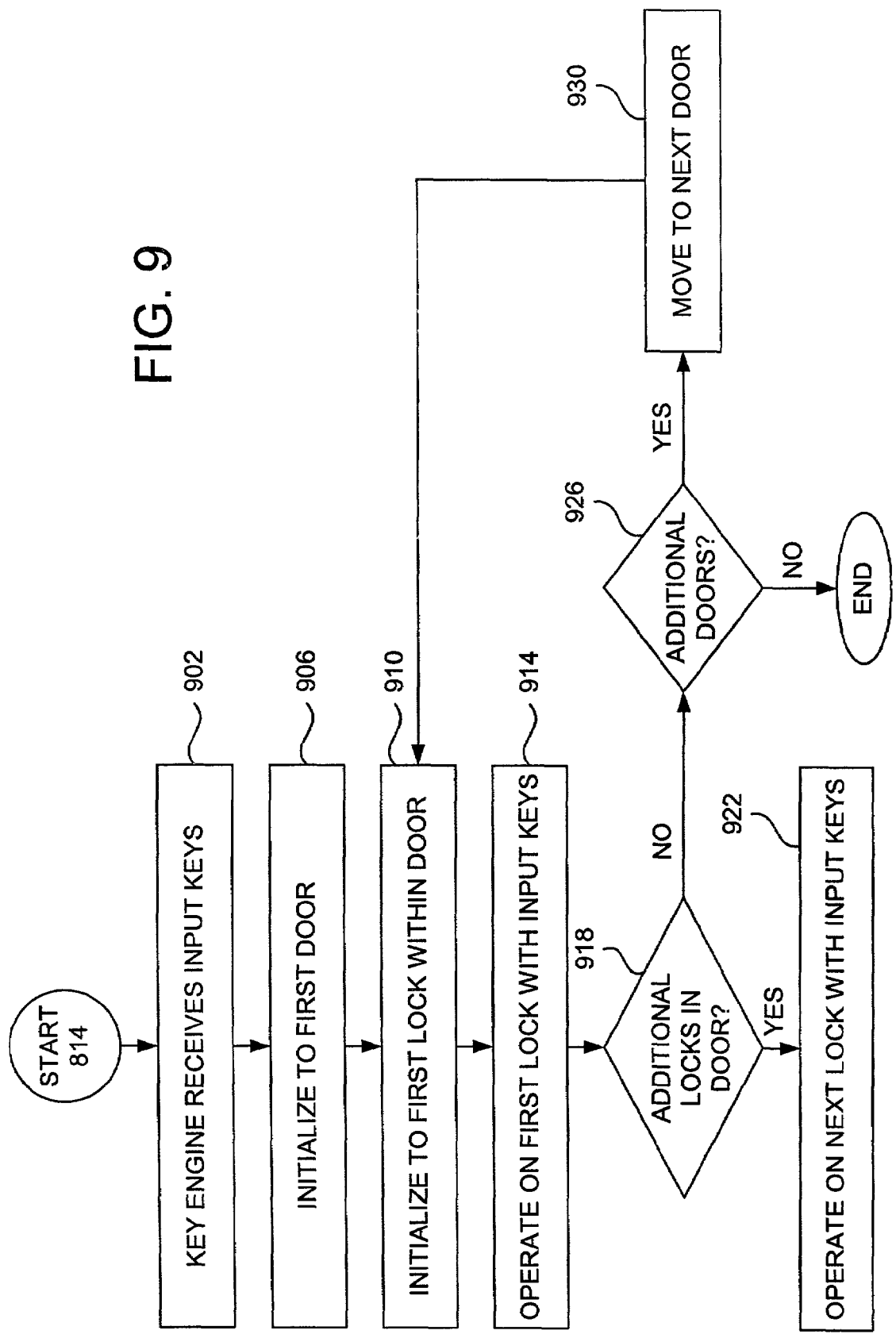
FIG. 9 is a flow diagram which illustrates step 814 of FIG. 8.

As previously mentioned with respect to step 814, local transaction keys may be applied to a local key database in order to produce enhanced keys. With reference to FIG. 9, the steps associated with one method of applying local transaction keys to a local key database will be described in accordance with an embodiment of the present invention. A process of applying local transaction keys begins at step 902 in which a key engine receives input keys, i.e., local transaction keys. The key engine, as discussed above with respect to FIG. 1B, is a part of a client, and may receive the input keys from a server system via a replicated database. Once the local transaction keys are received, the first door, or series of locks, associated with the key engine or a local key database is initialized in step 906. It should be appreciated that substantially any suitable method may be used to initialize a first door.

After the first door is initialized in step 906, the first lock within the "current" door, e.g., the first door, is initialized in step 910. Then, in step 914, the first lock is operated upon with the input keys received in step 902. Typically, if the lock is operated upon successfully by the input keys, then the indication is that the input keys are versions of pre-existing keys. If the lock is not operated upon successfully, then in one embodiment, an alert may be generated to indicate that input keys were not successfully applied to a local key database. It should be understood that the operation of input keys on the first lock may result in the generation of enhanced keys.

In step 918, a determination is made as to whether there are additional locks associated with the door, e.g., the first door to which the input keys were initialized in step 906. If it is determined that there are no additional locks associated with the door, then process flow moves to step 926 in which a determination is made regarding whether there are additional doors to be operated upon using the input keys. When it is determined that there are no additional doors, the process of applying local transaction keys to a local key database is completed. However, when it is determined that there is at least one additional door remaining, then the implication is that the locks associated with any additional doors are to be operated upon. Accordingly, the next door that is available is identified in step 930, and the input keys are initialized to the first lock within the next door in step 910.

Alternatively, if it is determined in step 918 that there are additional locks in the door, then the indication is that the entire door has yet to be operated upon. Hence, the next lock associated with the door is operated upon in step 922, and process flow returns to step 918 and a determination of whether there are additional locks in the door.

Profiling Engine Embodiment

Figure 10:
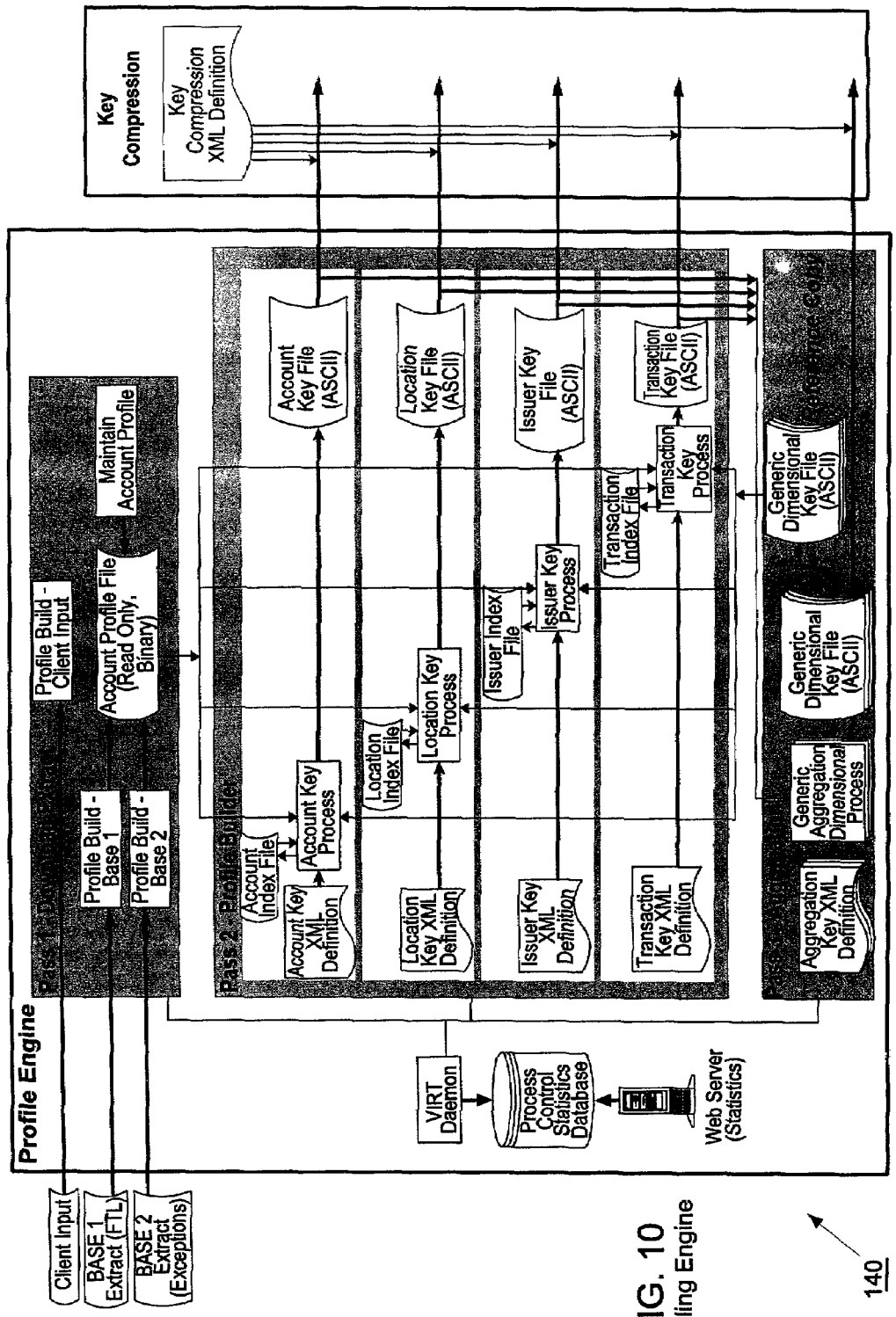
FIG. 10 is a possible system architecture for the profiling engine of FIG. 1B.

FIG. 10 illustrates one possible system architecture for the profiling engine of FIG. 1B. As described earlier, the profiling engine accepts input from transactional information sources 138, which may include BASE I and BASE II. BASE I is a component of the VisaNet Integrated Payment System that provides online authorization services for Visa International Service Association and other transactions. BASE I performs Stand-in Processing and supports PIN Verification Service, Card Verification Value Service, Address Verification Service, etc. BASE II provides global electronic processing of clearing and settlement transactions. The system collects and distributes financial and non-financial information and reports between members. Of course, input may come from other sources as previously described.

The profiling engine processes transaction data to generate risk profiles for the key compression engine. Output from the profiling engine is directed to database 150 and to clustering engine 142. Key compression as shown is performed by the profiling engine.

In turn, the key compression engine converts the account risk profiles into key/lock structures. Shown in FIG. 10 are the processes, input files, output files, control mechanisms and monitoring mechanisms for implementing the profiling engine. The processes and structures shown are organized by "passes." Each pass describes a group of operational processes that are executed as a group prior to execution of a subsequent pass. Pass 1 filters the BASE I and BASE II transaction extracts. Pass 2 compresses the transaction data and generates risk curve data for the key compression engine. Pass 3 provides interim data used by Pass 2 to aggregate information across the Pass 2 processes. A daemon job control mechanism manages the execution of all Pass 1, 2 and 3 processes.

Regarding Pass 1, the download extract pass, it selects the BASE I and BASE II fields applicable to the profiling engine and organizes them into an Account Profile File. The BASE I Extract contains the FTL account transaction data. It is acquired on a daily basis. The BASE I Extract is provided as an input to the Profile Build—BASE I process on a daily basis. The BASE II Extract contains the clearing and settlement exception data. It is acquired by the BASE II Extract on an "as available" basis, which occurs at least once per week.

Inputs from the client may be provided. These inputs would consist of data distinct from that provided by the Profile Build—BASE I and II processes. An example is e-mail addresses associated with accounts. The control processes and data formats of files in this pass are preferably updated accordingly to process and store this information.

The Profile Build Processes filter and merge the BASE I Extract, the BASE II Extract, and the Client Input, it then merges these into the Account Profile File. The Account Profile File contains a binary representation of the daily output of Pass 1 with the integrated and filtered BASE 1 Extract, BASE 2 Extract and Client input account data. The Account Profile File is generated once per day, stored in binary form, and configured as a read-only file, to be used in Pass 2.

Regarding Pass 2, the profile builder pass, it builds the account risk profiles necessary for the key compression engine to calculate risk ratio. The profile builder pass relies on various XML control definitions to guide the driving processes of this pass. There are various key index working files used to drive processes of this pass to speed processing. The profile builder also relies on previous day versions of the Pass 3 aggregation run.

There are several processes in Pass 2 that process specific keys. The four processes currently are: Account Key; Location Key; Issuer Key; and Transaction Key. Each process follows these steps:
1. Acquires the Pass 1 output binary Account Profile File;
2. Updates the corresponding Index File to incorporate any new field values encountered in the Account Profile File;
3. Utilizes the Account Profile File, the pertinent Index File, and pertinent Dimensional Key File outputs from the Reference region of the Aggregation Pass 3 to generate risk average ratios for each key type (e.g., account, location, issuer, transaction). The risk ratios are specific field instances divided by the total number of field instances; and
4. Utilizes the Key XML Definition file to format the output of this process into the ASCII-based, space-delimited format necessary for the key compression engine.

The Key Index File contains a compressed version of all valid permutations of the process specific key (e.g., account, location, issuer, transaction) fields. The index is used to represent the applicable permutation encountered in each account transaction captured from the Account Profile File. The formula for obtaining the index is reversible such that the permutation can be calculated based upon the index. For each process within Pass 2, there is a Key XML file that is used to drive the given Key Process. The file contains the processing instructions that will tell the process how to behave. The Key Processes (e.g., account, location, issuer, transaction) in Pass 2 generate an output Key File. This Key File contains the risk ratios for the specific key field.

Regarding Pass 3, the Aggregation Pass, it has various Aggregation Dimensional Processes that combine Pass 2 outputs for subsequent input to the Pass 2, to aggregate field risk ratios. The Pass 3 processes illustrated in FIG. 10 are lumped together and called the Generic Aggregation Dimensional Process. The output from each Aggregation Dimensional Process is stored in a Reference Region such that it can be used the next day as the input to the Pass 2 set of processes. The Aggregation Dimensional Process utilizes the Aggregation XML Definition control format to drive the Aggregation Dimensional Process and format the (Generic) Dimensional Key File output. These output files are generated daily, stored in the reference region, and also forwarded to the Key Compression engine.

The Aggregation Dimensional Process takes inputs from various Pass 2 Profile Builder processes, aggregates select transaction field data from them as defined by the Aggregation Key XML Definition file, outputs the pertinent transaction field data into the Generic Dimensional Key files based on format definition from the Aggregation Key XML Definition file, forwards them to the Key Compression engine, and stores them as a Generic Dimensional Key File in the Aggregation Reference Region. The Reference Region represents the results of a previous pass iteration. It is next used in a following day's profile process. There are preferably multiple Aggregation Key XML Definitions, Aggregation Dimensional Processes, and Generic Dimensional Key Files (e.g., MCC-Zip).

For each Generic Aggregation Dimensional Process there is an Aggregation XML file used by the Aggregation Dimensional Process to control the content and manner of aggregation to be written to the Generic Dimensional Key output file. The Generic Aggregation Dimensional Process generates an output Generic Dimensional Key File. This file contains the risk ratios for the aggregation of key fields. The format of this file is specified by the Aggregation XML Definition described above and is such that each account transaction key field risk ratio is delimited by a space. This file is stored in ASCII format.

Although only a few embodiments of the present invention have been described, it should be understood that the present invention may be embodied in many other specific forms without departing from the spirit or the scope of the present invention. By way of example, the present invention has been described as being suitable for use in a distributed environment where a client and a server are associated with substantially separate computing environments. However, it should be appreciated that the client and the server may not necessarily be separate computing environments. In other words, the present invention may be implemented with respect to a client and a server which share the same process.

In general, the steps associated with the various methods of the present invention may be widely varied. For instance, steps may be added, removed, reordered, and altered. As an example, the steps associated with processing a transaction on a server may include, in one embodiment, encrypting keys and secondary keys in addition to encrypting key changes. Therefore, the present examples are to be considered as illustrative and not restrictive, and the invention is not to be limited to the details given herein, but may be modified within the scope of the appended claims.

We claim:

1. A method of assessing a financial fraud risk within a distributed client/server system, said method comprising:
   receiving first and second financial transactions from transactional information sources at a central computer system;
   generating first features for said first financial transaction at said central computer system, said first features including probability information;
   generating second features for said second financial transaction at said central computer system, said second features including probability information;
   determining feature changes between said first features and said second features at said central computer system;
   encrypting said feature changes at said central computer system;
   transmitting said encrypted feature changes from said central computer system to a client computer system;
   receiving a local, current financial transaction at a client computer system;
   encrypting said current transaction at said client computer system;
   generating local features from said encrypted current transaction at said client computer system, said local features including probability information;
   comparing said local features to said received feature changes at said client computer system; and
   scoring the result of said comparing to produce a fraud risk value associated with said local, current financial transaction, whereby the risk associated with said current financial transaction is assessed in a distributed manner.

2. A method as recited in claim 1 wherein said scoring is performed using a risk prediction model.

3. A method as recited in claim 1 wherein said local, current transaction includes at-source data not generally available to said central computer system.

4. A method as recited in claim 1 wherein said first financial transaction, said second financial transaction and said current transaction all relate to the same financial account.

5. A method as recited in claim 1 further comprising:
   generating secondary features for said first financial transaction;
   generating secondary features for said second financial transaction;
   determining secondary feature changes between secondary features of said first and second financial transactions;
   encrypting said secondary feature changes; and
   transmitting said encrypted secondary feature changes from said central computer system to said client computer system.

6. A method as recited in claim 1, further comprising:
   generating enhanced features as result of said comparing; and
   transmitting said enhanced features to said central computer system.

7. A distributed risk assessment system for assessing a financial fraud risk, said system comprising:
   a transaction engine that produces first and second financial transactions;
   a profiling engine of a central computer system that receives said first and said second financial transactions and generates first features and second features of said financial transactions respectively, said first and second features including probability information;
   a clustering engine of said central computer system that stores said first features and said second features into a cluster database;
   a replication engine of said central computer system that determines feature changes between said first features and said second features, and encrypts said feature changes;
   a database of a client computer system that stores said encrypted feature changes;
   a local engine of said client computer system that receives a current transaction, encrypts said current transaction, and generates local features from said current transaction, said local features including probability information, wherein said local engine also compares said local features to said encrypted feature changes and scores the result to produce a fraud risk value associated with said local, current financial transaction, whereby the risk associated with said current financial transaction is assessed in a distributed manner.

8. A system as recited in claim 7 further comprising:
   a risk prediction model of said client computer system used to produce said fraud risk value.

9. A system as recited in claim 7 wherein said current transaction includes at-source data not generally available to said central computer system.

10. A system as recited in claim 7 wherein said first financial transaction, said second financial transaction and said current transaction all relate to the same financial account.

11. A system as recited in claim 7 wherein said clustering engine further generates secondary features for said first financial transaction and secondary features for said second financial transaction, and wherein said replication engine further determines secondary feature changes between said secondary features of said first and second financial transactions, and wherein said replication engine further encrypts said secondary feature changes and transmits said encrypted secondary feature changes from said central computer system to said client computer system.

12. A system as recited in claim 7 wherein said local engine of said client computer system further generates enhanced features as result of said comparing and transmits said enhanced features to said central computer system.

* * * * *